US011570589B1

(12) United States Patent
Cheung et al.

(10) Patent No.: US 11,570,589 B1
(45) Date of Patent: *Jan. 31, 2023

(54) TECHNIQUES FOR ENHANCING GROUP COMMUNICATION ON A MOBILE DEVICE

(71) Applicant: Meta Platforms, Inc., Menlo Park, CA (US)

(72) Inventors: Vincent Charles Cheung, Redwood City, CA (US); Connie Yeewei Ho, San Jose, CA (US); Daniel Tsuan, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,547

(22) Filed: Oct. 31, 2021

Related U.S. Application Data

(63) Continuation of application No. 16/655,276, filed on Oct. 17, 2019, now Pat. No. 11,172,338, which is a
(Continued)

(51) Int. Cl.
*G06F 3/0482* (2013.01)
*H04W 4/14* (2009.01)
(Continued)

(52) U.S. Cl.
CPC ............ *H04W 4/14* (2013.01); *G06F 3/0481* (2013.01); *G06F 3/0482* (2013.01); *H04W 4/08* (2013.01); *H04W 8/186* (2013.01)

(58) Field of Classification Search
CPC ......... H04W 4/14; H04W 4/08; H04W 8/186; G06F 3/0481; G06F 3/0482
See application file for complete search history.

(56) References Cited

U.S. PATENT DOCUMENTS 7,698,644 B2 * 4/2010 Hawk ..................... H04L 67/75
370/352
9,628,950 B1 * 4/2017 Noeth ................... H04W 4/021
(Continued)

OTHER PUBLICATIONS

Setting to disable pin/unpin messages?, Nov. 2014, retrieved from—https://meta.discourse.org/t/setting-to-disable-pin-unpin-messages/22306, 3 pages (Year: 2014).*
(Continued)

*Primary Examiner* — Yongjia Pan
(74) *Attorney, Agent, or Firm* — Sheppard Mullin Richter & Hampton LLP

(57) ABSTRACT

Techniques for enhancing group communication on a device are described. A method may include presenting a message in a message portion of a user interface (UI) for a group communication application executing on a first device, where the group communication application communicates messages among multiple devices. The method may further include monitoring an input component for the first device and detecting a first control directive from the input component. The first control directive may select a message displayed in the message portion of the user interface. The method may further include performing a pin operation on the selected message; and presenting the pinned message in a banner portion of the UI. Other embodiments are described and claimed.

24 Claims, 23 Drawing Sheets

Related U.S. Application Data continuation of application No. 16/555,858, filed on Aug. 29, 2019, now Pat. No. 11,153,726, which is a continuation of application No. 16/247,961, filed on Jan. 15, 2019, now Pat. No. 10,880,699, which is a continuation of application No. 14/558,346, filed on Dec. 2, 2014, now Pat. No. 10,225,700.

(51) Int. Cl.
*G06F 3/0481* (2022.01)
*H04W 8/18* (2009.01)
*H04W 4/08* (2009.01)

(56) References Cited

U.S. PATENT DOCUMENTS

| | | | | |
|---|---|---|---|---|
| 2002/0065881 | A1* | 5/2002 | Mansikkaniemi | H04L 9/40 709/204 |
| 2008/0141146 | A1* | 6/2008 | Jones | G06Q 10/107 715/753 |
| 2009/0094343 | A1* | 4/2009 | Mehrotra | G06F 15/16 709/207 |
| 2010/0057854 | A1* | 3/2010 | Chinnam | G06Q 10/10 709/206 |
| 2014/0215352 | A1* | 7/2014 | Blecon | H04L 12/1827 715/752 |
| 2015/0142901 | A1* | 5/2015 | Hon | H04L 51/226 709/206 |

OTHER PUBLICATIONS

[Official Topic] Sticky topics in groups, Apr. 26, 2011, retrieved from—https://www.flickr.com/help/forum/en-us/72157626586044788/, 11 pages (Year: 2011).*

* cited by examiner

LOGIC FLOW 2000

*2300*

TECHNIQUES FOR ENHANCING GROUP COMMUNICATION ON A MOBILE DEVICE

PRIORITY CLAIM

This application claims benefit under 35 U.S.C. § 120 as a Continuation of application Ser. No. 16/655,276, filed Oct. 17, 2019, which is a Continuation of application Ser. No. 16/555,858, filed Aug. 29, 2019, which is a Continuation of application Ser. No. 16/247,961, filed Jan. 15, 2019, which is a Continuation of application Ser. No. 14/558,346, filed Dec. 2, 2014, issued as U.S. Pat. No. 10,225,700 on Mar. 5, 2019. The entire contents of which is hereby incorporated by reference as if fully set forth herein. Applicant hereby rescinds any disclaimer of claim scope in the parent application(s) or the prosecution history thereof and advise the USPTO that the claims in this application may be broader than any claim in the parent application(s).

BACKGROUND

Mobile computing devices such as smart phones and tablet computers offer a variety of ways for their operators to communicate with others. In addition to electronic mail and telephone calls, messaging applications allow people to communicate in text, video, and/or audio formats with one or more people. When large numbers of operators, e.g. more than two or three, participate in the same communication session, e.g. in a "group chat", it may be difficult for the participants to keep track of the conversation thread or topic. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for enhancing group communication on a mobile device. Some embodiments are particularly directed to techniques for affixing or "pinning" a message to a banner portion of a group communication application interface such that the message remains visible to all participants even as additional messages are exchanged. In one embodiment, for example, a method may include presenting a message in a message portion of a user interface (UI) for a group communication application executing on a first device, where the group communication application communicates messages among multiple devices. The method may further include monitoring an input component for the first device and detecting a first control directive from the input component. The first control directive may select a message displayed in the message portion of the user interface. The method may further include performing a pin operation on the selected message; and presenting the pinned message in a banner portion of the UI. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
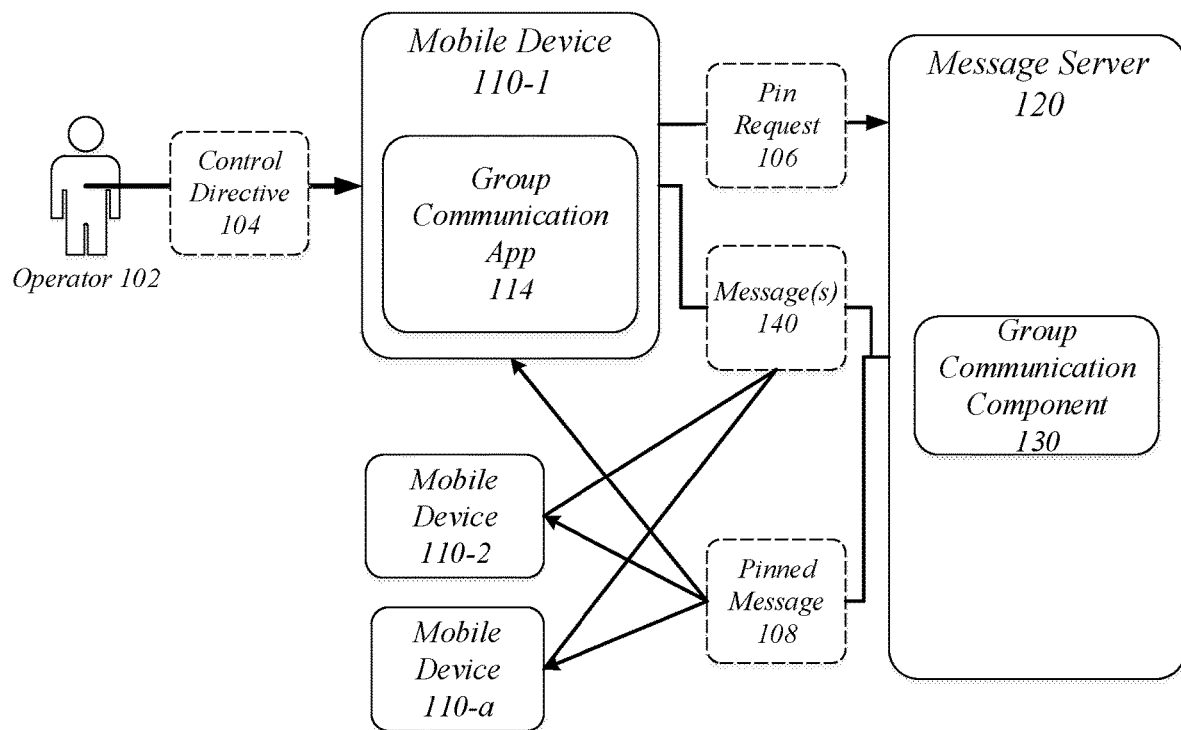
FIG. 1 illustrates an embodiment of an execution system for enhancing content on a mobile device.

Various embodiments are generally directed to techniques for enhanced group communication on a mobile device. Some embodiments are particularly directed to techniques for presenting a message received during a group communication session in a fixed location upon receiving a command directive to "pin" a message. The pinned message remains in view to all participants in the group communication session even as additional messages are received and presented, and as the original message may scroll out of view.

Users of mobile devices may communicate with users of other mobile devices in various ways. In particular, users may communicate non-telephonically with multiple other users in a group communication, for example, via a short message service (SMS) application, a multimedia messaging service (MMS) application, a video communication service, and so forth. As the number of participants in a particular communication session increases, the conversational threads may appear disjointed and hard to follow. Additionally, if one or more of the participants misses a portion of the communication session, it can be difficult to determine what the current topic of conversation is.

Accordingly, embodiments allow any participant in a group communication session to select a message in the group communication session to "pin." A pinned message may be placed in a fixed portion of the user interface and remain visible even as additional messages are received and presented. The pinned message may be selected by a participant, for example, if the message represents a current topic of conversation, or contains a question that the group participants are discussing. A pinned message may be unpinned later, or replaced by another message.

A group communication application may include a pinning component that monitors one or more input components for a control directive. When a specific control directive is received on a displayed message in a group communication session, a pin operation may be performed on that message. The pin operation may cause the message to be presented in a banner portion of a user interface for the group communication
application and the pinned message may remain in the banner portion until unpinned, replaced with a new pinned message, or until an expiration period. In some embodiments, a pinned message may include structured data having fields with values that can be updated from subsequent messages received from the participants. As a result, the embodiments can improve the user experience with a mobile device and provide continuity and context to participants in a group communication session.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to an apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct a more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an execution system 100 for enhancing group communication. In one embodiment, the system 100 may comprise a computer-implemented system 100 having a mobile device 110-1 and a message server 120, each comprising one or more components. Although the system 100 shown in FIG. 1 has a limited number of elements in a certain topology, it may be appreciated that the system 100 may include more or fewer elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of mobile devices 110-*a* may include five mobile devices 110-1, 110-2, 110-3, 110-4 and 110-5. The embodiments are not limited in this context.

The execution system 100 ("system 100") may include a mobile device 110-1. The mobile device 110-1 may be any mobile electronic device capable of receiving control directives, e.g. a control directive 104, from an operator, e.g. operator 102, and capable of communicating with other devices, e.g. a message server 120, to exchange data and instructions over a network. The mobile device 110-1 may further be capable of displaying messages 140 to the operator 102.

The mobile device 110-1 may include various software components, such as a group communication application (or "app") 114. The group communication app 114 may include instructions that when executed by a processing circuit (not shown) cause the mobile device 110-1 to perform the operations of the group communication app 114 as will be described herein. Generally, the group communication app 114 may be installed by the user and may enable the communication of messages 140 to and from the mobile device 110-1 and other mobile devices.

The group communication app 114 may monitor input components of the device for a specific control directive 104. The specific control directive, when received, may select a message displayed in a message portion of a user interface (UI) for a pin operation. In response to receiving the specific control directive 104, the group communication app 114 may send a pin request 106 to a message server 120 to request a pin operation on a message 140 indicated or selected by the control directive 104. The group communication app 114 may receive a pinned message 108, as well as other messages 140, from the message server 120.

A pin request 106 may include the selected message 140, or an identifier that the message server 120 can use to locate the selected message for the pin operation. The pin request 106 may be of any form that invokes the function of a component that will perform the pin operation, e.g. a function call, a command, and so forth.

A pinned message 108 may be the message 140 selected for a pin operation enhanced with metadata to indicate that it is a pinned message. The metadata may include, for example, a tag, flag, keyword, or other data attached to or associated with the message to indicate that the message is pinned.

In an embodiment, the message server 120 may send a pin command with the message identifier to the individual mobile devices 110, rather than the whole pinned message 108. The individual mobile devices 110 may then place the identified message in a banner portion of the UL Messages 140 may include a variety of message types. For example, and without limitation, a message 140 may include text, an image, a link or reference to a document or web site, a video, or a combination of any of these. A message 140 may be in a structured data format, having one or more fields that can hold values, as will be discussed further. For the purposes of discussion, messages 140 are generated by an operator via one or more input components on a mobile device, and are not intended to include application- or operating system-generated data communicated to other devices.

The system 100 may also include a message server 120. The message server 120 may include any computing device capable of communication with mobile devices such as mobile devices 110-1 to 110-a over a network to exchange data and instructions.

The message server 120 may include various components, including but not limited to, a group communication component 130. The group communication component 130 may include a set of software instructions for performing one or more operations related to managing one or more group communication sessions. For example, the group communication component 130 may receive messages 140 from one or more mobile devices 110 used by operators who wish to communicate with each other. The group communication component 130 may receive a message 140 from one mobile device, e.g. mobile device 110-2, and determine what other operators and mobile devices are participating in a group communication session with the operator of mobile device 110-2, and may send the message 140 to the other mobile devices. The group communication component 130 may perform a pin operation in response to receiving a pin request 106 from a mobile device 110, as will described further below.

It is of note that although the examples described herein generally include two or more participants, a group communication session may also comprise a single participant, who may use a pinned message, for example, as a reminder.

Figure 2:
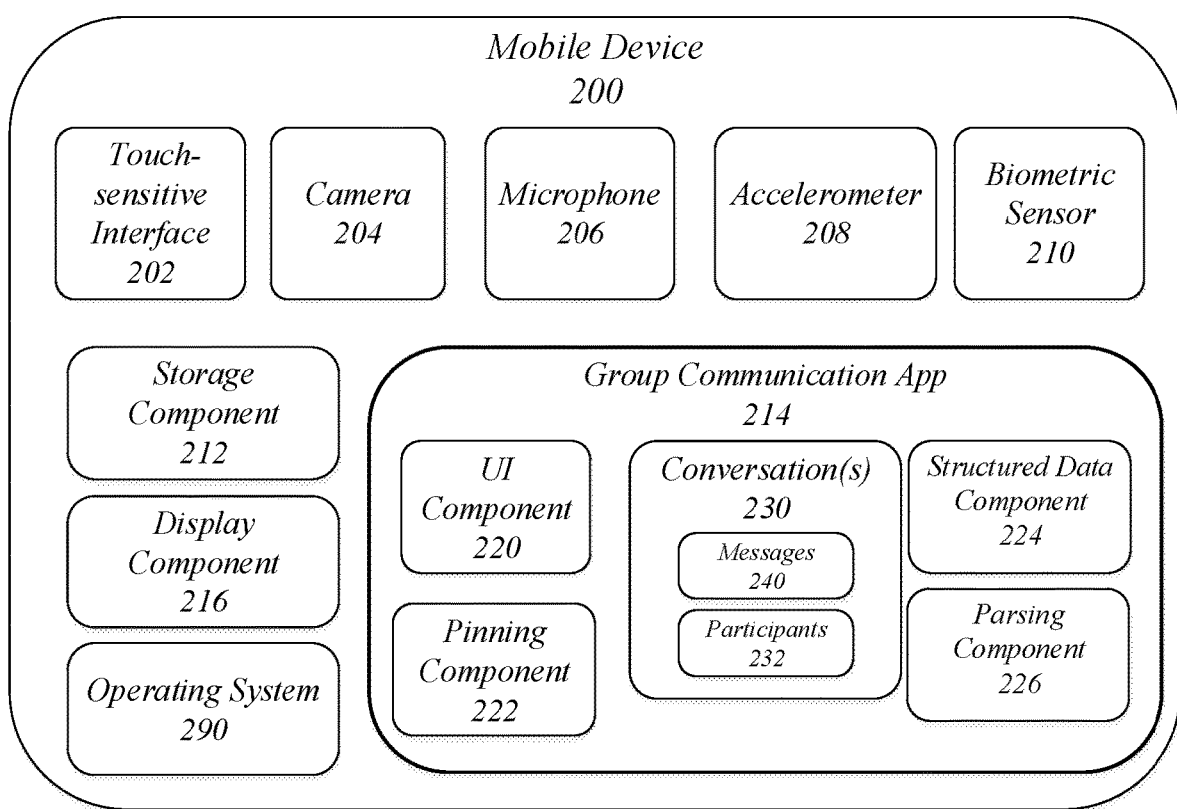
FIG. 2 illustrates an embodiment of a mobile device for the system of FIG. 1.

FIG. 2 illustrates a block diagram of a mobile device 200 for the system 100. The mobile device 200 may be an embodiment of mobile device 110. The mobile device 200 may include various hardware components, such as various input components and a display component 216. The input components may include any interface components capable of receiving information from the operator 102, such as, but not limited to, a touch-sensitive interface 202, a camera 204, a microphone 206, an accelerometer 208 and a biometric sensor 210. Other input components may also be included, such as a global positioning system (GPS) component, an altimeter, and so forth.

A display component 216 may include any interface components capable of presenting information to the operator 102, such as, but not limited to, a screen for visual output, a speaker, and a vibration component. In some embodiments, the display component 216 and the touch-sensitive interface 202 may be integrated into one touch-sensitive display screen.

The mobile device 200 may further include a storage component 212 in the form of one or more computer-readable storage media capable of storing data and instructions for the functions of apps, such as a group communication app 214 and an operating system 290. In addition, the storage component 212 may store messages 240. As used herein, "computer-readable storage medium" is not intended to include carrier waves, or propagating electromagnetic or optical signals.

Mobile device 200 may include a group communication app 214, which may be an embodiment of the group communication app 114. The group communication app 214 may include various functional components such as, but not limited to, a user interface (UI) component 220, a pinning component 222, a structured data component 224, and a parsing component 226. More, fewer, or other components may be used to provide the described functionality.

The group communication app 214 may manage one or more group communication sessions, also referred to as conversations 230. A conversation 230 may be defined, at least in part, by a grouping of participants 232. In some embodiments, a conversation 230 may be uniquely defined by the grouping of participants 232. For example, if participants A, B, and C participate in a first conversation, and participants A and B participate in a second conversation, the first and second conversations may be considered separate and distinct conversations from each other.

In other embodiments, a conversation 230 may be distinguished from other conversations with other identifiers, for example, and without limitation, by an assigned identifier, by a time- or date-stamp of the start of the conversation, by a location or locations of the participants, by a combination of any of these identifiers, or any other means for distinguishing one conversation from another.

In various embodiments, only the participants 232 of a conversation 230 can view and send messages 240 to the other participants 232 of the conversation 230. Other individuals who are not also participants may not view messages 240 or send messages 240, regardless of their possible relationships to any of the participants 232. If a participant 232 chooses to leave a conversation 230, that participant may be prevented from viewing any messages 240 that were sent after the participant left the conversation.

In various embodiments, the participants 232 may be members of a social network, for example, FACEBOOK by Facebook Inc. of Menlo Park, Calif., GOOGLE+ by Google Inc. of Mountain View, Calif., LINKEDIN by LinkedIn Corporation of Mountain View, Calif., and so forth. In various embodiment, each participant 232 of a conversation 230 may have a social network connection to at least one other participant in the conversation. In various embodiments, the group communication app 214 may be provided by the social network entity. In other embodiments, the group communication app 214 may be provided by a third party to a social network entity but may have access to member connections within a social network. The embodiments are not limited to these examples.

In various embodiments, the participants 232 may include individual people, as well other entities, such as, and without limitation, a business, an organization, a group, a computer, or an artificial intelligence. Such an entity could use a pinned message to provide, for example, tracking information for a package, a purchase transaction, a receipt, a coupon, important news, and so forth.

The UI component 220 may present UI elements used to provide a group communication session. For example, and without limitation, the UI component 220 may provide a message composition UI element to allow a participant to compose a message 240 to send to the participants 232. The UI component 220 may present messages 240 on the display component 216. The UI component 220 may provide selectable UI elements that allow an operator-participant to add other participants to the conversation 230, to edit messages, to copy, paste, and delete messages, and to pin a message as will be described herein. The UI component 220 may provide a structured data composer UI to receive message data and generate a structured data message from the received message data.

The UI component 220 may monitor the input components for a specific control directive that initiates a pin operation, referred to herein as a pinning control directive. For example, the UI component 220 may monitor the touch-sensitive interface 202 for a gesture or a touch in a specific location. The UI component 220 may monitor the camera 204 for a motion of a non-touch gesture. The UI component 220 may monitor the microphone 206 for a spoken or other audio command. The UI component 220 may monitor the accelerometer 208 for a sequence and/or speed of motions. The UI component 220 may monitor the biometric sensor 210 for specific biometric inputs, such as a fingerprint or a retinal scan. The embodiments are not limited to these examples. In an embodiment, a pinning component 222, rather than the UI component 220, may monitor the input components for the pinning control directive.

When a pinning control directive is detected, the UI component 220 may invoke the pinning component 222. The pinning component 222 may receive information from the UI component 220 about which message 240 is to be pinned. The pinning component 222 may cause the identified message to be pinned. In an embodiment, the pinning component 222 may, for example, send a pin request to a message server with the identified message. The pinning component 222 may receive a pin command from a message server with an identifier of the message to be pinned. The pinning component 222 may instruct the UI component 220 to place the message to be pinned into a banner portion of the UI for the group communication app 214.

The pinning component 222 may send a pin request directly to the other mobile devices involved in the conversation 230 in which the pinning control directive was received, rather than using a message server. The pinning components on the other mobile devices may receive the pin request and prompt their respective UI components 220 to place the message to be pinned into the banner portion.

The group communication app 214 may include a structured data component 224. The structured data component 224 may generate structured data messages that can be sent and received by the participants 232 of a conversation 230. A structured data message may include fields that can hold values, and may be modifiable. For example, a message may include a date, a time, a location, a participant's name, or other values. Structured data is discussed further with respect to FIG. 8.

The group communication app 214 may include a parsing component 226. The parsing component 226 may parse a received message to identify various data elements. The parsing component 226 may look specifically in text for dates, times, proper nouns, addresses, nouns, and verbs, while ignoring or discarding articles, conjunctions, pronouns and other non-substantive words. For example, the parsing component 226 may parse a message to identify dates, times, names, and locations for an event. In an embodiment, every message 240 may be parsed as it is received.

Alternatively, a message 240 may only be parsed when it is associated with a pin request. The parsing component 226 may provide parsed elements from a message to the structured data component 224. The structured data component 224 may use the parsed elements to generate a structured data message, or to update the values in an existing pinned structured data message.

Figure 3:
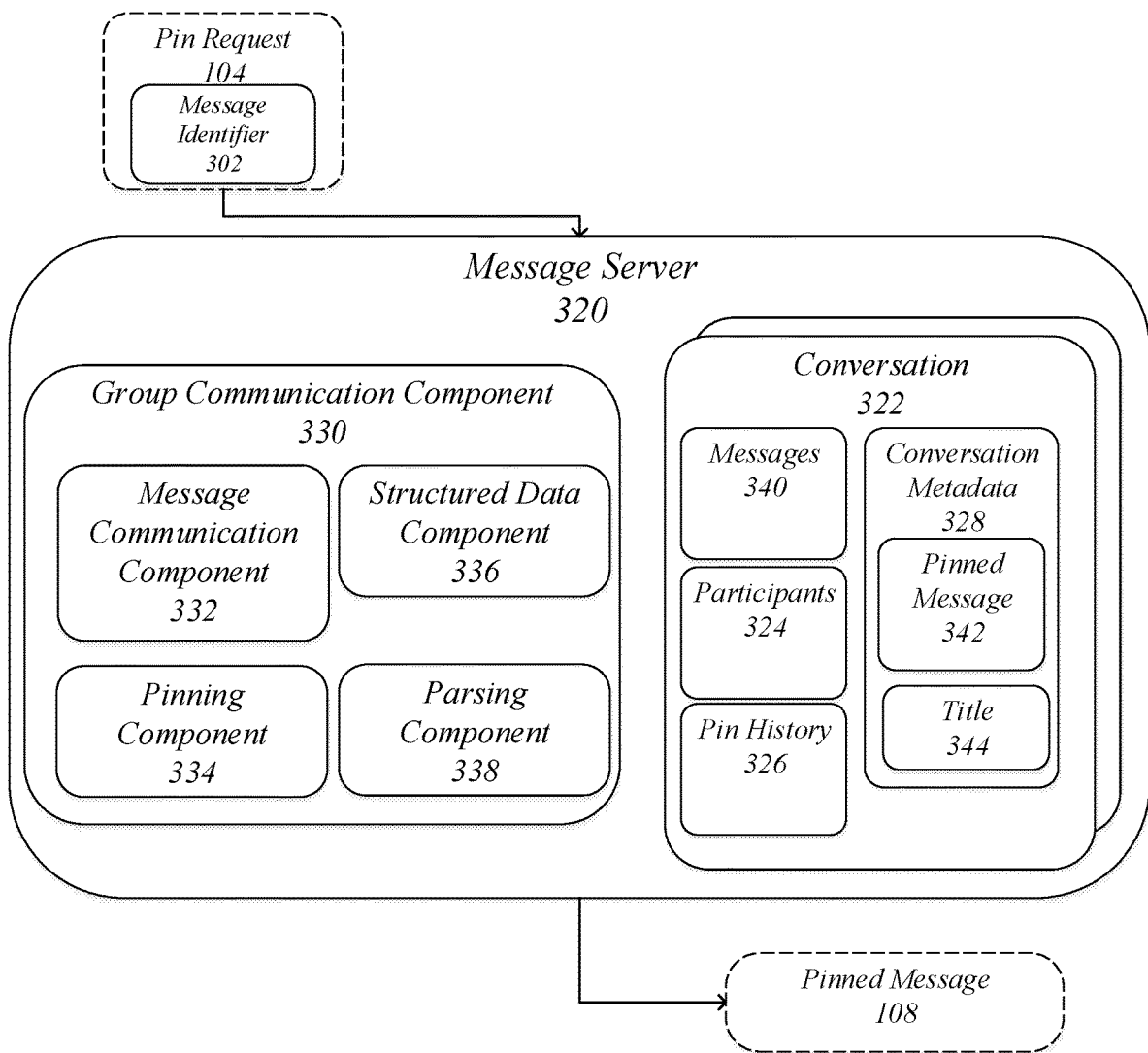
FIG. 3 illustrates an embodiment of a message server for the system of FIG. 1.

FIG. 3 illustrates a block diagram of a message server 320 for the system 100. The message server 320 may be an embodiment of the message server 120. The message server 320 may include various hardware elements (not shown) and discussed for example, with respect to FIG. 17. The message server 320 may include various software components, for example, one or more applications, such as a group communication component 330. The group communication component 330 may be an embodiment of the group communication component 130. The group communication component 330 may provide a server-side application that communicates with a client-side application such as group communication app 114 to coordinate the sending and receiving of messages among participants of a group communication session.

The group communication component 330 may itself include various functional components to perform the methods and operations described herein, such as, but not limited to, a message communication component 332, a pinning component 334, a structured data component 336 and a parsing component 338. More, fewer, or other components may be used to provide the described functionality.

The group communication component 330 may include a message communication component 332. The message communication component 332 may receive messages 140 from participants 324 in a conversation 322 and forward the messages to the other participants 324 in the conversation 322. The message communication component 332 may keep track of a plurality of group communication sessions, e.g. multiple conversations 322. In some embodiments, for each conversation 322, the message communication component 334 may store some or all of the messages 340 sent in the conversation 322 and a list of participants 324 of the conversation 324. In some embodiments, none of the messages 340 may be stored, and the pin request 106 may include the actual message to be pinned, which may be stored until it is unpinned.

When a message 340 is received from one of the participants 324, the message communication component 332 may determine what other participants 324 are to receive the message, and may send the message to only those participants. When a particular participant sending a message 340 is a participant in a plurality of conversations, the message communication component may determine from which conversation the message was sent so that only the participants of the determined conversation receive the message.

The group communication component 330 may include a pinning component 334. The pinning component 334 may receive a pin request 104 from the mobile device of one of the participants in a conversation. The pin request 104 may include a message identifier 302 that indicates which message 340 is to be pinned. The message identifier 302 may include, for example and without limitation, the message to pin, a copy of the message to pin, the text of the message to pin, a message identification code separate from the message, a link to a stored copy of the message, or any identifier that allows the group communication component 330 to locate or identify the message in the conversation to be pinned. A message identification code may include a numeric or alphanumeric code assigned to the message that may be unique within the conversation.

The pin request 104 may include a command, a keyword, a function call, a uniform resource locator (URL), or any other means to invoke a pin operation from the pinning component 334.

The pinning component 334 may locate the message to be pinned from the message identifier 302 in the messages 340 of a conversation 322. The message to be pinned may be marked and forwarded to the other participants as a pinned message 108, for example, by setting a flag or variable value to indicate that the message is pinned.

The message to be pinned may be stored as a stored pinned message 342 in conversation metadata 328. The stored pinned message 342 may include, for example, and without limitation, the actual message, a copy of the actual message, or the message identifier 302. Other conversation metadata 328 may include, for example, a title 344 of the conversation, if set, or any other data about the conversation 322, such as a date and time the conversation began.

When a conversation 322 has had more than one pinned message 342, the pinning component 332 may store a pin history 326 with the conversation 322. The pin history 326 may keep track of all of the pinned messages of the conversation. The pin history 326 may include a list, database, array or other data structure that stores the actual pinned messages, references to pinned messages, copies of pinned messages, or other information that allows previously pinned messages to be retrieved and presented. In various embodiments, time and date information may be stored as part of conversation metadata 328, message metadata, or pin history data, to allow a chronological ordering of the previously pinned messages.

The group communication component 330 may include a structured data component 336. The structured data component 336 may be similar or analogous to the structured data component 224. In various embodiments, the structured data component 336 may generate structured data messages from messages 340 received from participants 324. The structured data component 336 may then send the structured data messages to the participants 324 of a conversation 322.

The structured data component 336 may use the parsing component 338, or receive parsed data from the parsing component 338 to generate or update structured data messages. The parsing component 338 may parse each message 340 received at the message server 320 for structured data field values and may, in some embodiments, suggest a structured data message type. For example, if the parsing component 338 parses a date and a time from a message, the message may be about an event, and the structured data component 336 may prompt the participant that composed the message to create an event-type structured data message. In some embodiments, only messages selected for pinning may be parsed for structured data field values.

Figure 4:
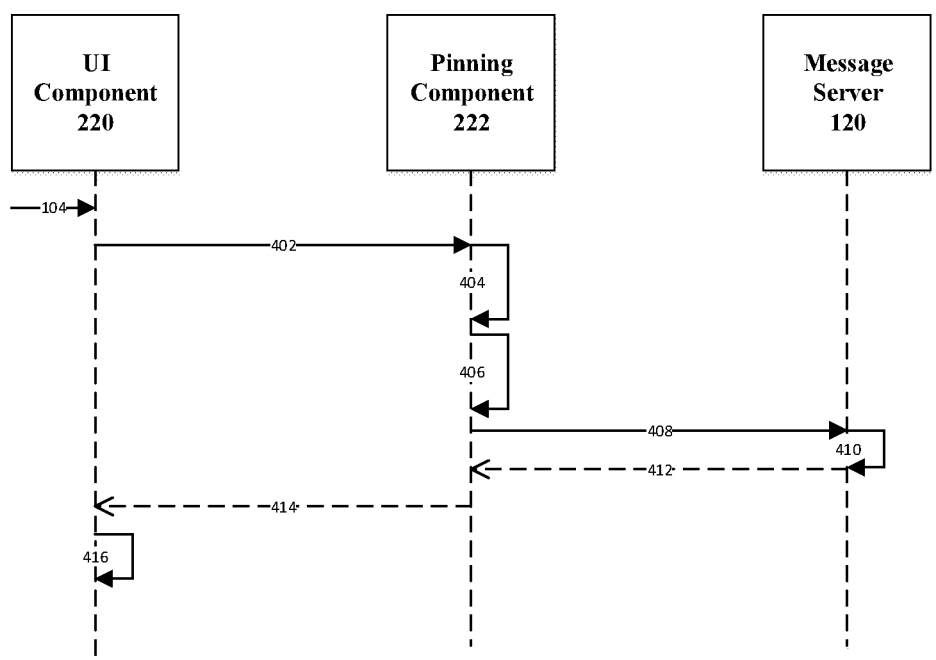
FIG. 4 illustrates an embodiment of a message flow for the system of FIG. 1.

FIG. 4 illustrates an embodiment of a message flow 400 for the system 100. Message flow 400 may represent messages communicated among the components of system 100. In particular, message flow 400 may occur among a UI component 220, a pinning component 222, and a message server 120. In the illustrated example, the UI component 220 and pinning component 222 may be components of one group communication app 114 executing on one mobile device 200. In the illustrated example, the group communication app 114 is executing in the foreground of the mobile device, that is, its UI is viewable on the display component.

In message flow 400, time flows from the top of the diagram toward the bottom. As used in FIG. 4, a "message" may include data and/or instructions communicated from one component to another, as well as internal functions within a component. Messages communicated among participants during a group communication session are referred to as conversation message(s) 140. Message flow 400 may represent messages communicated during a group communication session when a mobile device participating in the group communication session receives a pinning control directive.

The message flow 400 begins when the UI component 220 detects a control directive 104. The control directive 104 may be a specific control directive that is associated with a pin operation. In an embodiment, the control directive 104 simultaneously selects a conversation message 140 to pin and begins the pin operation. Alternatively, the control directive 104 may be a combination of control directives, for example, one control directive that selects a conversation message 140 and another control directive that selects or begins a pin operation.

The message flow 400 continues when the UI component 220 invokes the pinning component 222 to perform the pin operation with message 402. The message 402 may include an indication of which conversation message 140 is selected. For example, the UI component 220 may provide a location where a touch gesture control directive was detected, or which conversation message 140 is presented at the location on the display component where a touch gesture control directive was detected.

The message flow 400 continues when the pinning component 222 identifies the conversation message 140 to pin, in message 404. The message 404 may include retrieving a message identifier 302 for the conversation message 140 indicated in the message 402. If the message 402 provides a location of the control directive 104 rather than the specific conversation message 140, the message 404 may include identifying which conversation message is presented at the location.

The message flow 400 continues with the pinning component 222 generating a pin request in message 406. The message 406 may be a command, function call, URL, or any data structure that can include the message identifier 302 and be communicated to another device.

The message flow 400 continues when the pinning component 222 communicates the pin request, e.g. a pin request 106, to the message server 120 in message 408.

The message flow 400 continues when the message server 120 performs a pin operation in message 410. The message 410 may include marking a conversation message 140 as a pinned message 342, and/or storing the conversation message 140 as a pinned message. The embodiments are not limited to these examples.

The message flow 400 continues when the message server 120 sends the pinned message as message 412 to the pinning component 222. The message 412 may be a pin command that includes the message identifier or the pinned message. The message 412 may be the message identifier or the pinned message without a pin command.

The message flow 400 continues when the pinning component 222 instructs the UI component 220 to present the pinned message in message 414. The message 414 may include the message identifier or the pinned message.

The message flow 400 continues when the UI component 220 presents the pinned message in a banner portion of the UI for the group communication app 114 in message 416. The banner portion of the UI may be a reserved area on the display component 216, e.g. a top portion or a bottom portion, where a pinned message is fixed and remains on display until unpinned or replaced with another pinned message.

Figure 5:
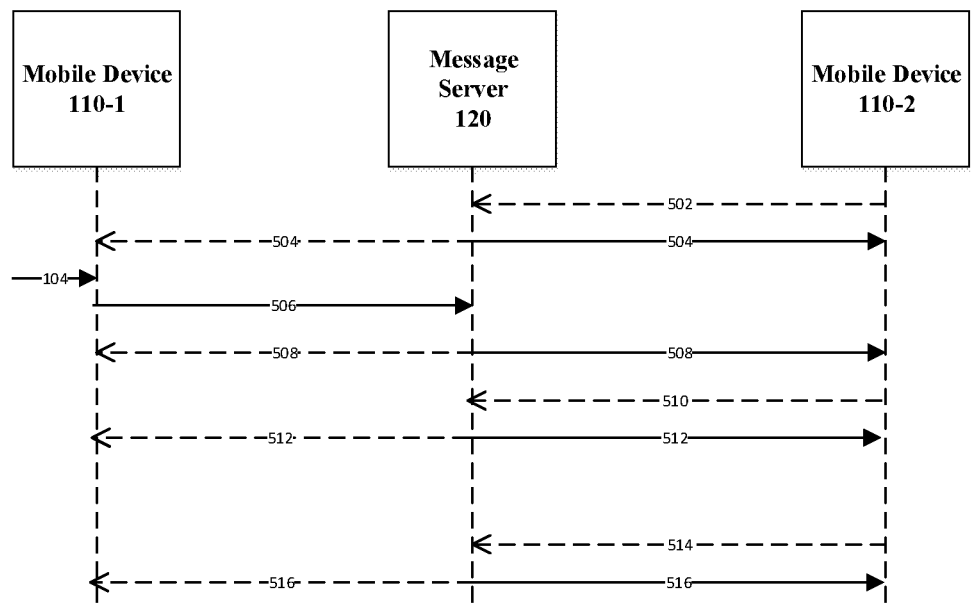
FIG. 5 illustrates an embodiment of a second message flow for the system of FIG. 1.

FIG. 5 illustrates an embodiment of a message flow 500 for the system 100. The message flow 500 may represent messages communicated among the components of system 100. In particular, the message flow 500 may occur among a plurality of mobile devices, e.g. mobile device 110-1 and mobile device 110-2, and a message server 120.

In the message flow 500, time flows from the top of the diagram toward the bottom. As used in FIG. 5, a "message" may include data and/or instructions communicated from one component to another, as well as internal functions within a component. Messages communicated among participants during a group communication session are referred to as conversation messages 140. Message flow 500 may represent messages communicated during a group communication session among multiple mobile devices as managed by the message server 120. Although only two mobile devices are shown, more than two mobile devices may be participating in a conversation.

The message flow 500 begins when the mobile device 110-2 sends a conversation message 140 as message 502 to the message server 120. The conversation message 140 may have been entered by an operator using a UI component in a group communication app executing on the mobile device 110-2.

The message flow 500 continues when the message server 120 sends the conversation message 140 to the mobile devices 110-1 and 110-2 operated by the participants in the conversation, in message 504. The mobile devices 110-1, 110-2 may present the conversation message 140 on a display component of the respective devices.

The message flow 500 continues when the mobile device 110-1 receives a control directive 104 that selects a conversation message 140, e.g. the message received with message 504, for a pin operation.

The message flow 500 continues when the mobile device 110-1 sends a pin request to the message server 120 in message 506. Of note is that any participant may select any conversation message 140 for a pin operation. The participants are not limited to pinning only conversation messages 140 that they have authored and sent.

The message flow 500 continues when the message server 120, having received the pin request in message 506, sends the pinned message to the mobile devices 110-1 and 110-2, in message 508. The respective mobile devices may present the pinned message on their display components, as described with respect to messages 414 and 416 in message flow 400.

The message flow 500 may continue when the mobile devices 110-2 sends an update request to the message server 120 in message 510. When the pinned message includes structured data, the update request message 510 may include a new value for a field in the structured data.

The message flow 500 continues when the message server 120 updates the pinned message based on the update request and sends the updated pinned message to the mobile devices 110-1 and 110-2 in message 508. In an embodiment, the message 508 may include the entire pinned message with the updated value. Alternatively, the message 508 may include an update command with the new value, and may require that the mobile devices update the pinned message at the device. In response to receiving the message 508, the mobile devices 110-1 and 110-2 may update the presented pinned message.

The message flow 500 continues when the mobile device 110-2 sends an unpin request to the message server in message 514. The mobile device 110-2 may have received a control directive from its operator that indicates that the operator wants to unpin the pinned message. Of note is that any participant may invoke an unpin operation on any pinned message, even on pinned messages that the participant did not pin, and/or did not compose.

The message flow 500 continues when the message server 120 unpins the pinned message and send an unpin command to the mobile devices 110-1 and 110-2 as message 516. Unpinning the pinned message may include, for example, removing a marking that indicated that the message was pinned, removing the pinned message from the conversation metadata, or a combination of these. The unpin command in the message 516 may, when received by a mobile device, prompt the UI component to remove the pinned message from the banner portion of the display component. When there is only one pinned message possible at a time, the message 516 may not need to include an identifier of a message to unpin. When more than one message may be pinned at the same time, the unpin request in message 514 may include a message identifier, and the unpin command in message 516 may include the message identifier.

In an embodiment, an unpin request and/or an unpin command may be sent automatically, without operator input, when a pinned message expires. Some pinned messages may be set to expire after a set time period, e.g. after one day, or three hours. Other pinned messages may include reference to a future time, and may expire once that time is in the past.

Figure 6:
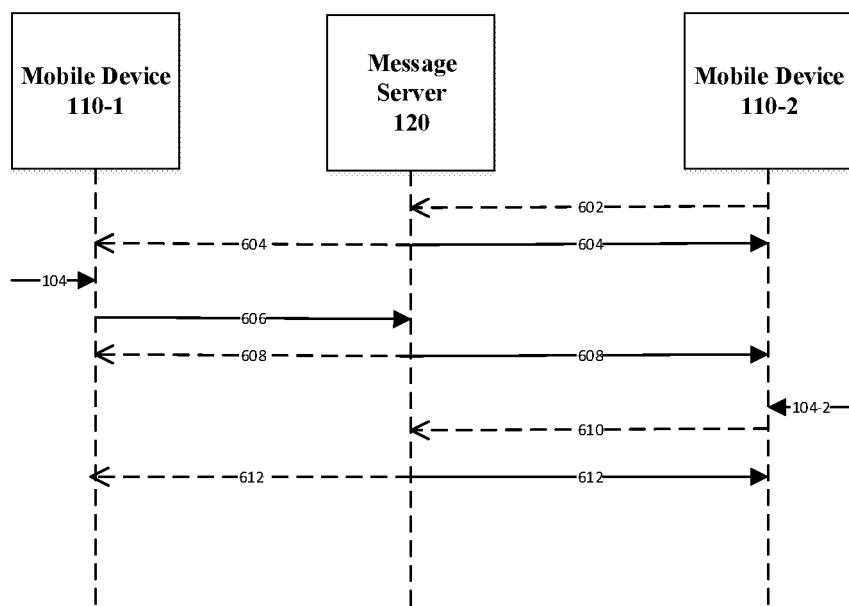
FIG. 6 illustrates an embodiment of a third message flow for the system of FIG. 1.

FIG. 6 illustrates an embodiment of a message flow 600 for the system 100. The message flow 600 may represent messages communicated among the components of system 100. The message flow 600 may occur among a plurality of mobile devices, e.g. mobile device 110-1 and mobile device 110-2, and a message server 120.

In the message flow 600, time flows from the top of the diagram toward the bottom. As used in FIG. 6, a "message" may include data and/or instructions communicated from one component to another, as well as internal functions within a component. Messages communicated among participants during a group communication session are referred to as conversation messages 140. The message flow 600 may represent messages communicated during a group communication session among multiple mobile devices as managed by the message server 120. Although only two mobile devices are shown, more than two mobile devices may be participating in a conversation.

The message flow 600 begins similarly to the message flow 500. That is, the mobile device 110-2 sends a conversation message 140 as message 602 to the message server 120. The message server 120 sends the conversation message 140 to the mobile devices 110-1 and 110-2 operated by the participants in the conversation, in message 604. The mobile devices 110-1, 110-2 may present the conversation message 140 on a display component of the respective devices. The mobile device 110-1 receives a control directive 104 that selects a conversation message 140, e.g. the message received with message 604, for a pin operation. The mobile device 110-1 sends a pin request to the message server 120 in message 606. The message server 120, having received the pin request in message 606, sends the pinned message to the mobile devices 110-1 and 110-2, in message 608. Messages 602, 604, 606, and 608 may be the same as, or analogous to, the messages 502, 504, 506, and 508, respectively.

The message flow 600 continues when the mobile device 110-2 receives a second pinning control directive 104-2. The pinning control directive 104-2 may select a different conversation message than the conversation message 140 selected by the first control directive 104.

The message flow 600 continues when the mobile device 110-2 sends a second pin request to the message server 120 in message 610. The message 610 may be of the same form as the message 608, although identifying a different conversation message to pin.

The message flow 600 continues when the message server 120 performs a second pin operation based on the second pin request, and sends the second pinned conversation message to the mobile devices 110-1 and 110-2 in message 612. The second pin operation may include unpinning the first pinned message. Alternatively, the second pin operation may cause the message identifier for the first pinned message to be stored in the pin history 326, and the pinned message 342 in the conversation metadata 328 to be replaced with the second pinned message, or to be presented in a layer above the previously pinned message in the banner portion.

The messages illustrated in message flows 400, 500 and 600 represent some possible message exchanges among the illustrated components and are not intended to limit the messages to the illustrated examples. Further, in any given group communication session, some of the message exchanges may not take place, may take place in a different order, and/or may be repeated any number of times.

Figure 7:
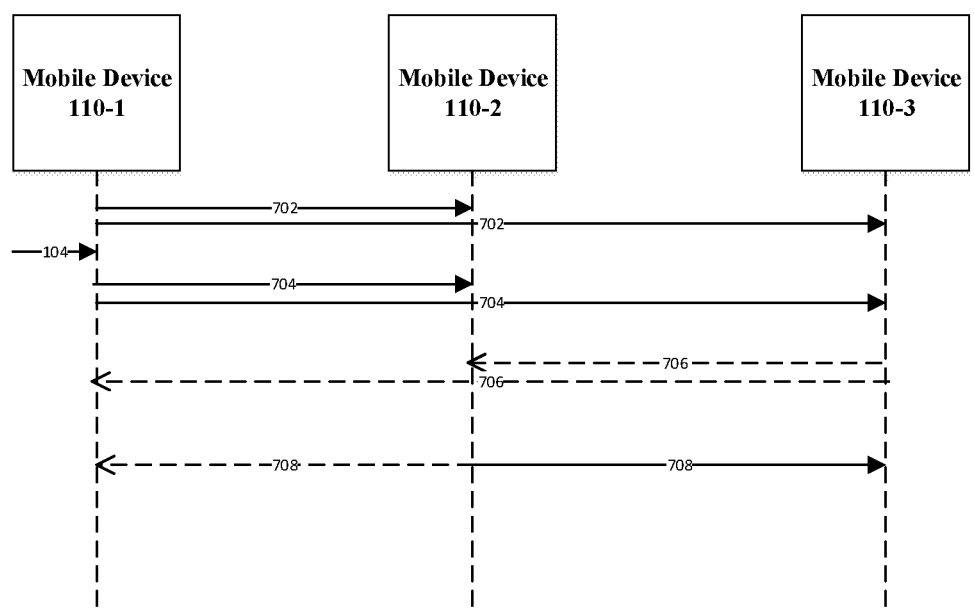
FIG. 7 illustrates an embodiment of a fourth message flow for the system of FIG. 1.

FIG. 7 illustrates an embodiment of a message flow 700 for the system 100. 100. The message flow 700 may represent messages communicated among the components of system 100. In particular, message flow 700 may occur among three mobile devices 110-1, 110-2, and 110-3. To simplify the discussion, only three mobile devices are shown. However, more than three mobile devices may communicate as shown, and the embodiments are not limited to only three devices.

In message flow 700, time flows from the top of the diagram toward the bottom. Message flow 700 may represent messages communicated during a group communication session among the illustrated mobile devices in an embodiment where no message server is used, e.g. in a peer-to-peer group communication session.

The message flow 700 may begin when the mobile device 110-1 sends a conversation message 702 to all of the other mobile devices participating in a conversation, e.g. the mobile devices 110-2 and 110-3. The conversation message 702 may have been composed by an operator of the mobile device 110-1 using a UI component of a group communication app 214, for example.

The message flow 700 may continue when the mobile device 110-1 receives a control directive 104 associated with a pin operation, as described above. The mobile device 110-1 may then identify the conversation to be pinned, e.g. message 702, and may send a pinned message 704 to all of the other mobile devices in the conversation. In an embodiment, the pinned message 704 may include a pin request or command, along with a message identifier, that causes the group communication apps executing on the other mobile devices to place the identified message in a banner portion of the display component. The mobile device 110-1, the one receiving the pinning control directive, may, simultaneously with sending the message 704, place the identified message in its own banner portion.

The message flow 700 may continue when the mobile device 110-3 sends an update request to the other mobile devices in message 706. When the pinned message includes structured data, the update request message 706 may include a new value for a field in the structured data. The mobile device 110-3 may send the message 706 in response to receiving a conversation message from its operator that includes a new value for the field. The message 706 may include the entire pinned message with the updated value. Alternatively, the message 706 may include an update command with the new value, and may require that the mobile devices update the pinned message at each device. In response to receiving the message 706, the mobile devices 110-1 and 110-2 may update the presented pinned message.

The message flow 700 may continue when the mobile device 110-2 sends an unpin command 708 to the other mobile devices. The mobile device 110-2 may have received an unpin control directive from its operator. The unpin command 708 may, when received by the other mobile devices, prompt a UI component of a group communication app 214 to remove the pinned message from the banner portion of the display component on that device. When there is only one pinned message possible at a time, the unpin command 708 may not need to include an identifier of a message to unpin. When more than one message may be pinned at the same time, the unpin command 708 may include a message identifier.

In some embodiments, a sending mobile device may not need to send a message or a pinned message to all other devices in the group communication session. Some of the mobile devices may relay the message to the other participating devices. This may potentially create conflicts in determining which pinned message is the latest pinned message. The participating mobile devices may use timestamps on the pinned messages, e.g. a timestamp local to the originating device, to determine which is the latest pinned message.

Figure 8:
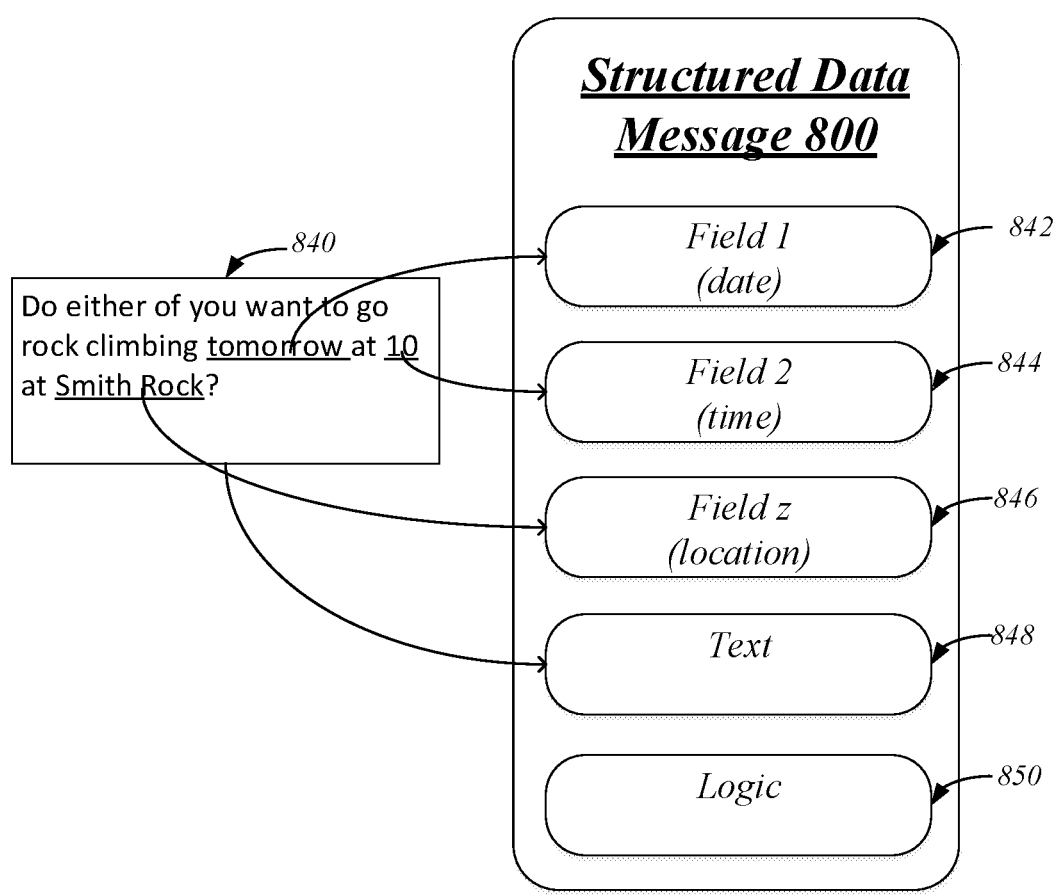
FIG. 8 illustrates an embodiment of a structured data message for the system of FIG.

FIG. 8 illustrates a block diagram of an embodiment of a structured data message 800 for the system 100. A structured data message 800 may include one or more fields that can hold values, analogously to a variable having a value. The values of the fields may be modifiable. In the illustrated example, the structured data message 800 represents structured data for an event and includes fields for a date 842, a time 844, and a location 846. The structure data message 800 may also include text 848 that is not modifiable.

The structured data message 800 may also include logic 850 that may allow conversions of data, for example, converting the word "tomorrow" into an actual date. The logic 850 may include instructions for other operations, for example and without limitation, that generate a structured data message, update field values, compute field values, and so forth.

As shown in FIG. 8, a message 840 includes various elements that, when parsed, may be used to generate or update the structured data message 800. In various embodiments, the type of value that a field may contain may be constrained. For example, date field 842 may only accept alphanumeric values in a standard date format, e.g. MM/DD/YYYY, or Month DD, YYYY. The value "tomorrow" in the message 840 may be converted using the logic 850 to a date in that format based on the current date. The time field 844 value may be set to the value "10". The location field 846 value may be set to the value "Smith Rock". The logic 850 may include instructions that search for a map address for a location name and may include the map address, or a link to a map sowing the address, in the location field 846. The other text in the message 840 may be stored in the text 848, and may include formatting to enable the insertion of the field values in the correct positions.

The structured data message 800 may be implemented in a variety of methods. For example, the structured data message 800 may be in the form of an extensible markup language (XML) document, a hypertext markup language (HMTL) document, a word processing template document, a web form, a database record, and so forth.

Figure 9:
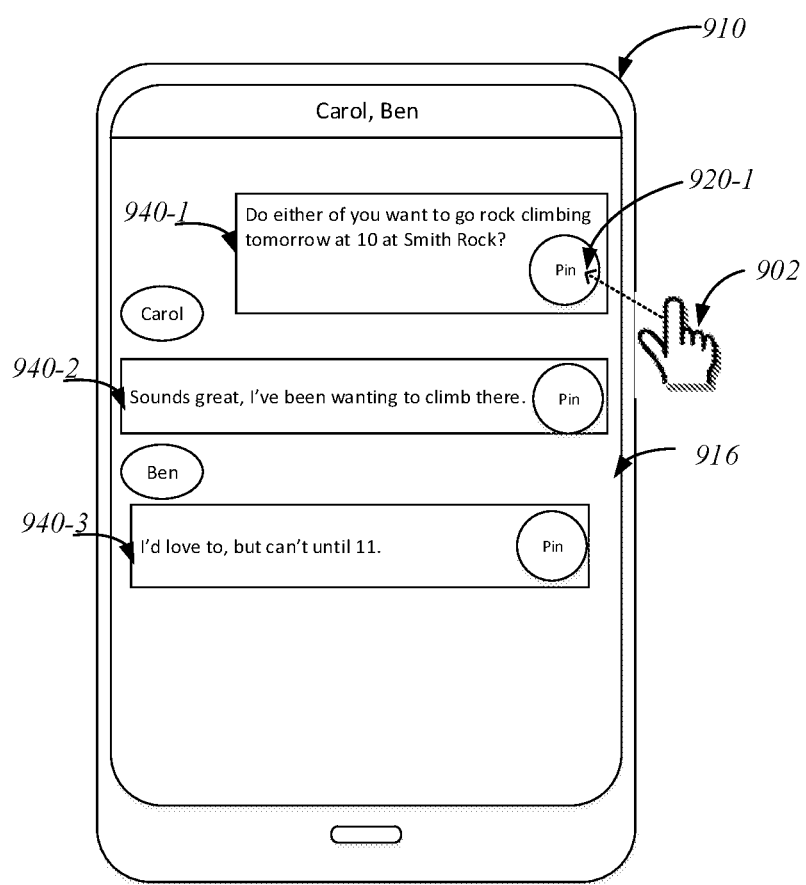
FIG. 9 illustrates an embodiment of a user interface for the system of FIG. 1.

FIG. 9 illustrates an embodiment of a user interface (UI) 900 for the group communication app 114. UI 900 may be presented on a display component 916 of mobile device 910, which may be embodiments of the display component 216 and of the mobile device 110 or 200, respectively. In the illustrated example, a group communication session is taking pace among operators named Carol and Ben, and the operator of the device 910, on their respective mobile devices. A series of messages is presented on the display component 916, including message 940-1 from the operator, message 940-2 from Carol and message 940-3 from Ben. Message 940-3 is the most recently received message.

Each message 940 may include a pinning UI element, e.g. pinning UI element 920-1, presented in proximity to or within each message 940. The display component 916 in the illustrated example may be a touch-sensitive screen. When a pinning UI element, e.g. the pinning UI element 920-1, is touched or tapped by an operator 902, this gesture may be converted into a control directive. In particular, the control directive may be one that a group communication app 114 receives as an indication to select the message associated with the pinning UI element, i.e. message 940-1, for a pin operation.

It is of note that any of the participants in the group communication session may select a pinning UI element on any message, including messages that the participant itself did not send, and messages sent and received at an earlier time in the session.

Figure 10:
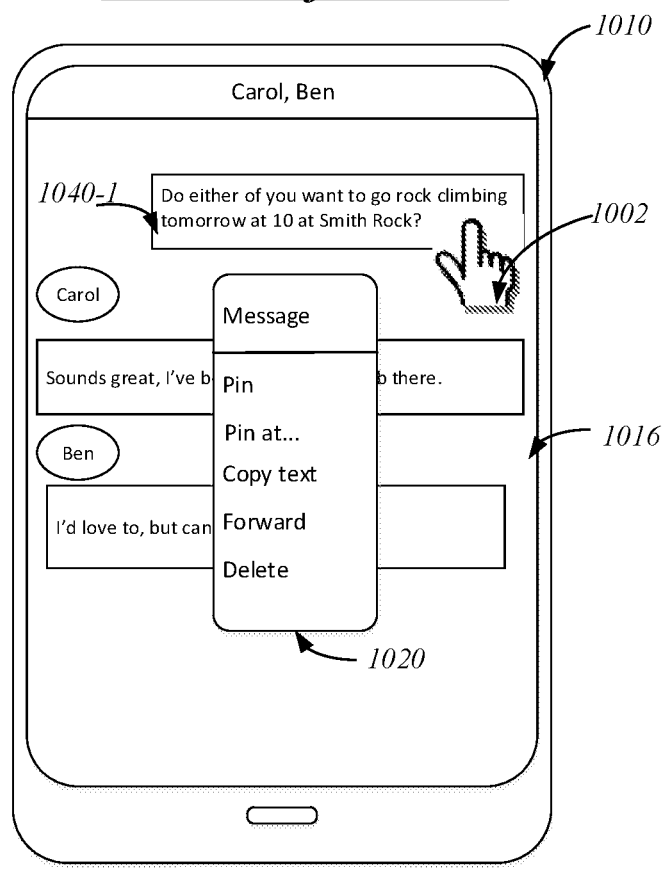
FIG. 10 illustrates an embodiment of a second user interface for the system of FIG. 1.

FIG. 10 illustrates an embodiment of a user interface (UI) 1000 for the group communication app 114. UI 1000 may be presented on a display component 1016 of mobile device 1010, which may be embodiments of the display component 216 and of the mobile device 110 or 200, respectively. As in UI 900, a series of messages exchanged among Carol, Ben and the operator 1002 is presented, including message 1040-1.

In the illustrated example, the group communication app 114 may detect a touch gesture within or near a presented message, e.g. the message 1040-1. The detected touch gesture may be converted into a control directive. In an embodiment, the touch gesture may be a gesture of a defined length on a touch sensitive input component, e.g. on the display component 1016 within a defined proximity to a location of a message on the display component 1016. In an embodiment, the touch gesture may be a gesture of a defined time on the touch sensitive input component. In an embodiment, the touch gesture may be a gesture of a defined shape on the touch sensitive input component.

In an embodiment, the detected touch gesture may be sufficient to cause the group communication app 114 to begin or request a pin operation on the message. In another embodiment, the detected touch gesture may cause a menu UI 1020 to be presented. The menu UI 1020 may include several options, including an option that, when selected by a second control directive, causes a pin operation to be performed. For example, the menu UI 1020 includes a "Pin" option and a "Pin at . . . " option, in addition to options for copying text of the message, forwarding the message to another operator, and deleting the message from the group communication session. In the illustrated example, if the operator 1002 performs a touch gesture on the "Pin" text in menu UI 1020, the menu UI 1020 may be removed from the display, and the pin operation may be performed.

It is of note that any of the participants in the group communication session may select any message to pin with a touch gesture control directive, including messages that the participant itself did not send, and messages sent and received at an earlier time in the session.

Figure 11:
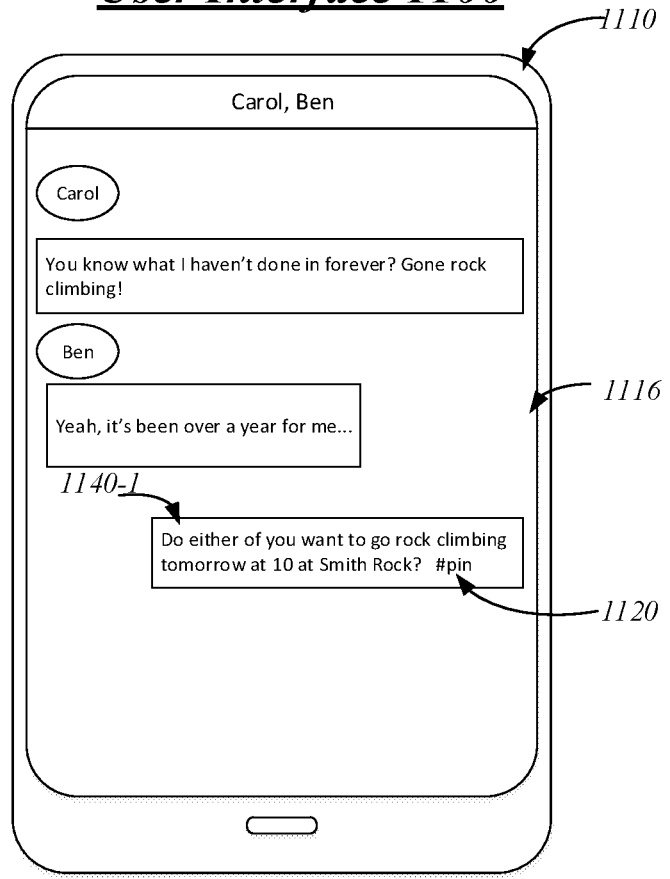
FIG. 11 illustrates an embodiment of a third user interface for the system of FIG. 1.

FIG. 11 illustrates an embodiment of a user interface (UI) 1100 for the group communication app 114. UI 1100 may be presented on a display component 1116 of mobile device 1110, which may be embodiments of the display component 216 and of the mobile device 110 or 200, respectively. As in UIs 900 and 1000, a series of messages exchanged among Carol, Ben and the operator is presented, including a message 1140-1.

In the illustrated embodiment, instead of detecting a touch gesture as a control directive for a pin operation, a group communication app 114 may look for reserved text in a message. For example, in message 1120-1, the operator has included the reserved text 1120, e.g. "#pin". The reserved text 1120 may indicate to the group communication app 114 that the message is to be pinned.

Figure 12:
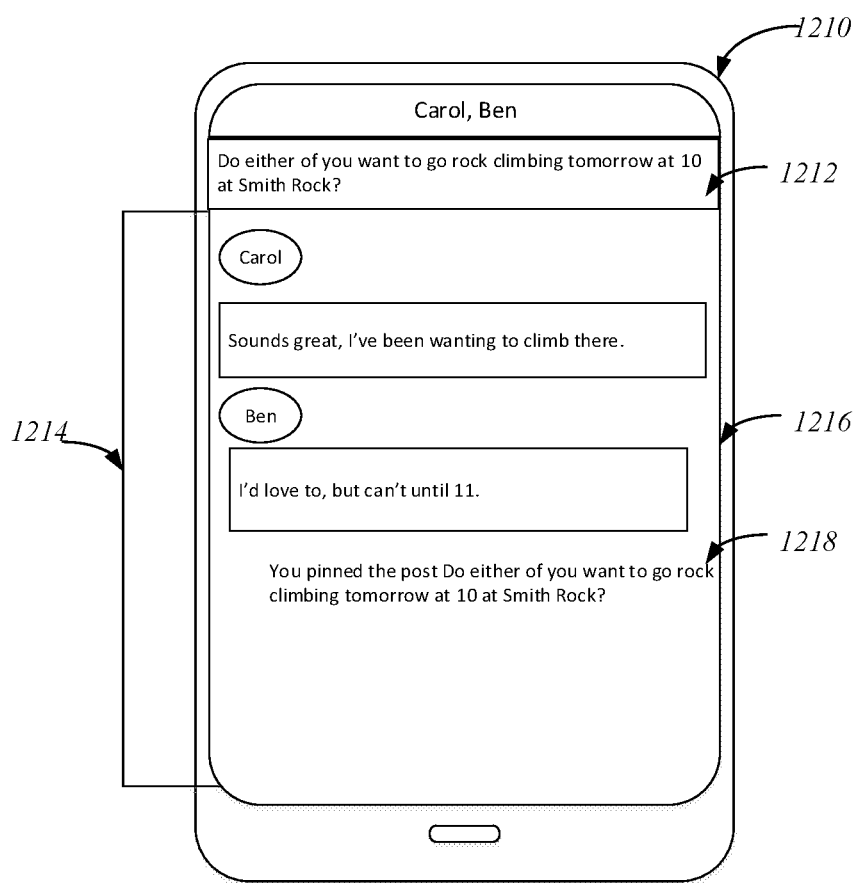
FIG. 12 illustrates an embodiment of a fourth user interface for the system of FIG. 1.

FIG. 12 illustrates an embodiment of a user interface 1200 for the group communication app 114. UI 1200 may be presented on a display component 1216 of mobile device 1210, which may be embodiments of the display component 216 and of the mobile device 110 or 200, respectively. As in the previously described UIs, a series of messages exchanged among Carol, Ben, and the operator is presented in a message portion of the UI 1200, indicated by bracket 1214.

The illustrated example shows what may occur as the result of a pin operation on a message. The pin operation may have taken place in response to any one of the methods discussed with respect to UIs 900, 1000, and 1100. The pinned message, e.g. message 940-1, is presented in a banner portion 1212 of the UI 1200. Of note in this example is that the original message is no longer visible in the message portion 1214 of the UI 1200, for example, because additional received messages have caused the original message to have scrolled out of view. The pinned message presented in the banner portion 1212 may be visible when the original message is still visible in the message portion 1214. In some embodiments, the banner portion 1212 may only be presented when there is a pinned message. In other embodiments, the banner portion 1212 may always be present, although it may remain blank in the absence of a pinned message, or may present other session related information or options.

In an embodiment, the UI 1200 may also display a confirmation of the pin operation in an alert 1218. In an embodiment, the alert 1218 may be displayed to only the operator that prompted the pin operation. In another embodiment, the alert 1218 may be displayed to all participants in the group communication session, albeit with the name of the pinning operator in place of the pronoun "you".

Figure 13:
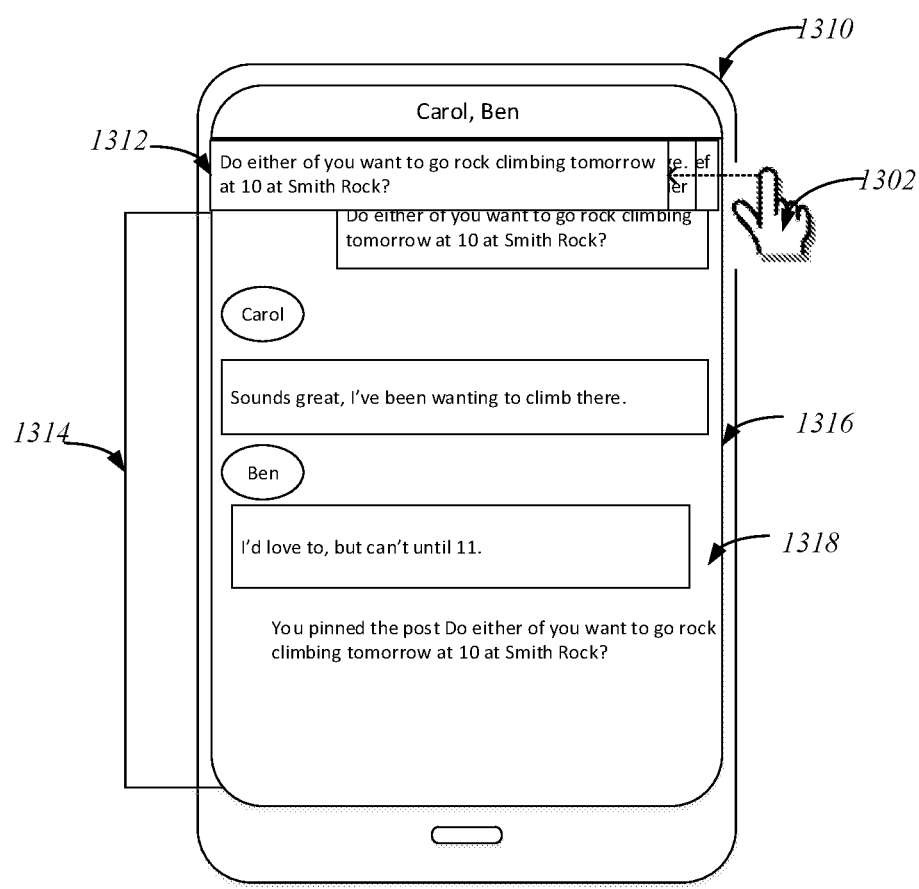
FIG. 13 illustrates an embodiment of a fifth user interface for the system of FIG. 1.

FIG. 13 illustrates an embodiment of a user interface 1300 for the group communication app 114. UI 1300 may be presented on a display component 1316 of mobile device 1310, which may be embodiments of the display component 216 and of the mobile device 110 or 200, respectively. As in the previously described UIs, a series of messages exchanged among Carol, Ben, and the operator is presented in a message portion of the UI 1200, indicated by bracket 1214.

In the illustrated example, multiple messages have been pinned during the course of the group communication session. The UI 1300 may allow an operator to access earlier pinned messages in various ways. For example, each pinned message may be presented on a layer on top of an earlier pinned message in the banner portion 1312. For example, the UI 1300 may receive a swiping or sliding touch gesture from an operator 1302 to reveal other layers of pinned messages, or to move or remove an entire pinned message and expose or present a pinned message on a lower layer.

In another embodiment, the UI 1300 could present a UI element that, when selected by a control directive, presents a viewing interface for pinned messages on other layers of the banner portion. For example, the UI 1300 could present a "View History" button in the banner portion, or may add an option to a menu similar to menu 1020 that includes a "history" selection. A viewing interface may, for example, open a window, tab or other UI element separate from the message portion 1318 that lists or otherwise presents some or all of the previously pinned messages. Closing such a viewing interface may return the operator to the UI 1300 as shown in FIG. 13.

Figure 14:
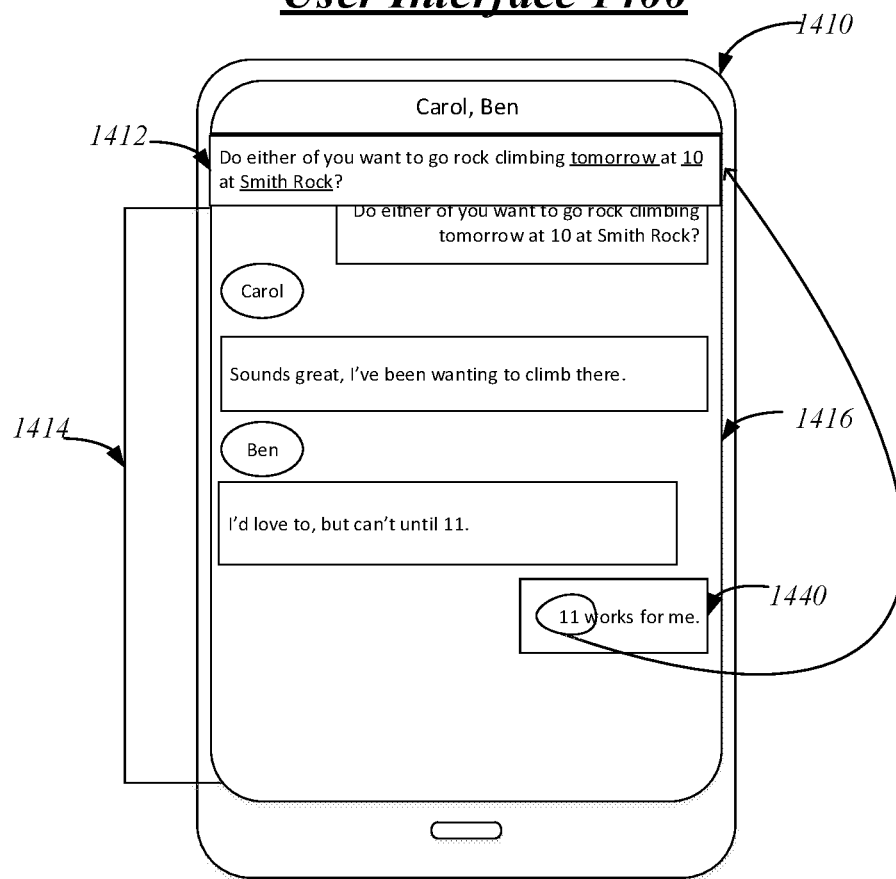
FIG. 14 illustrates an embodiment of a sixth user interface for the system of FIG. 1.

FIG. 14 illustrates an embodiment of a user interface 1400 for the group communication app 114. UI 1400 may be presented on a display component 1416 of mobile device 1410, which may be embodiments of the display component 216 and of the mobile device 110 or 200, respectively. As in the previously described Uis, a series of messages exchanged among Carol, Ben, and the operator is presented in a message portion of the UI 1400, indicated by bracket 1414.

In the illustrated example, the message pinned in banner portion 1412 is a structured data message having three fields: a date, a time, and a location. Each field has a value: "tomorrow", "10", and "Smith Rock", respectively. A message 1440 is presented that includes a new value for one of the fields, e.g. the value "11" for the time field. In an embodiment, the new value may be used to update the pinned message. That is, the value "10" in the time field may be removed and replaced with the value "11" from the message 1440. The pinned message in banner portion 1412 may then change to display an "11" in the place of the "10."

In some embodiments, the group communication app 114 may automatically detect a new value and update the pinned message. In some embodiments, the group communication component 130 on the message server 120 may detect a new value in a message and update the pinned message. In still other embodiments, the group communication app 114 may detect the new value but request that the group communication component 130 perform the update. In still other embodiments, one of the participants may make a control directive associated with the message 1440 that causes an update operation to take place. The embodiments are not limited to these examples.

Figure 15:
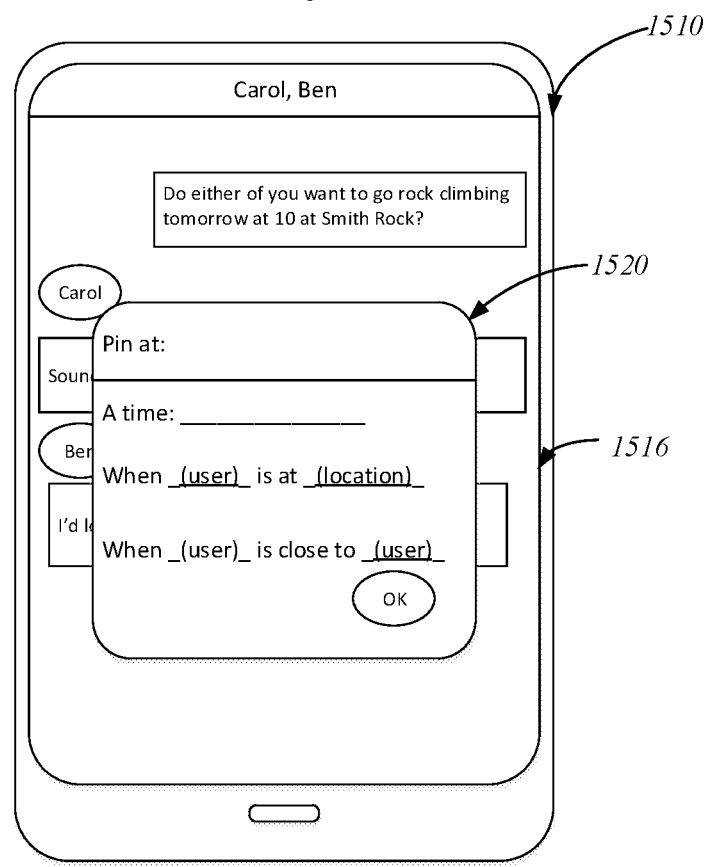
FIG. 15 illustrates an embodiment of a seventh user interface for the system of FIG. 1.

FIG. 15 illustrates an embodiment of a user interface 1500 for the group communication app 114. UI 1500 may be presented on a display component 1516 of mobile device 1510, which may be embodiments of the display component 216 and of the mobile device 110 or 200, respectively. As in the previously described UIs, a series of messages exchanged among Carol, Ben, and the operator is presented.

In the illustrated example, there is no pinned message yet. The UI 1500 shows what may occur when the menu option "Pin at . . . " shown on menu 1020 from FIG. 10 is selected. The UI 1500 may be presented, in the alternative, when a specific control directive associated with a "pin at" operation is received. The UI 1500 may present a menu UI element 1520 with selections for a delayed pin operation. The menu UI element 1520 may include selections to set one or more conditions that, when met, cause a selected message to be pinned. For example, the operator could enter a time, and at that time, the selected message may be presented in the banner portion. The operator may also, or alternatively, enter a participant's name and a location. When the identified participant is determined to be at the location, the selected message may be presented in the banner portion. The operator may also, or alternatively, enter two (or more) participants' names. When those identified participants are in proximity to each other, the selected message may be presented in the banner portion. The proximity may be defined in an application setting, or when setting the condition. The embodiments are not limited to these examples. Once the conditions are entered via one of the input components, the operator may select "OK" to set the conditions for pinning.

Figure 16:
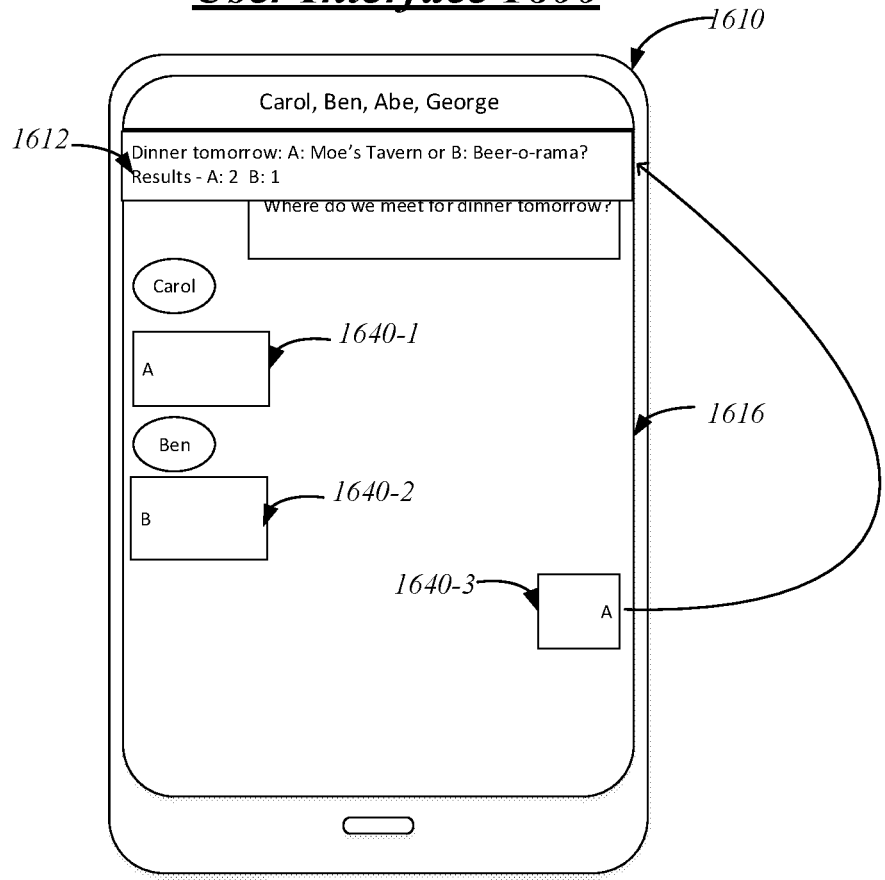
FIG. 16 illustrates an embodiment of an eighth user interface for the system of FIG. 1.

FIG. 16 illustrates an embodiment of a user interface 1600 for the group communication app 114. UI 1600 may be presented on a display component 1616 of mobile device 1610, which may be embodiments of the display component 216 and of the mobile device 110 or 200, respectively. The UI 1600 presents a series of messages exchanged among Carol, Ben, Abe, George, and the operator. In the illustrated example, the pinned message in the banner portion 1612 is a poll question having two responses: A and B.

In an embodiment, when the pinned message is a poll, the group communication app 114 or the group communication component 130 may parse messages, e.g. messages 1640-1, 1640-2, and 1640-3 for poll responses. The responses to the poll may be presented in the banner portion 1612 with the pinned message, as shown, or may be presented in response to a control directive. In an embodiment, a poll pinned message may be implemented as a structured data message, having a field for each poll response, and logic to update a count for each field when a message including a response is received.

In addition to polls, a pinned message may be used for many interactive processes, such as, but not limited to, turn-based games, or other collaborative processes.

In some embodiments, the pinned message may be removed from a user's display without unpinning the message for the group. For example, the operator may use a UI element or other control directive to hide the pinned message after it is seen, or to shrink the pinned message to a smaller view to take up less space. The pinned message could also be hidden while the operator scrolls down in the conversation, and may reappear when scrolling stops or while scrolling up. The operator may use a UI element or other control directive to dismiss the pinned message in the operator's view of the conversation such that the pinned message does not reappear, but without propagating the unpinning to other devices.

Figure 17:
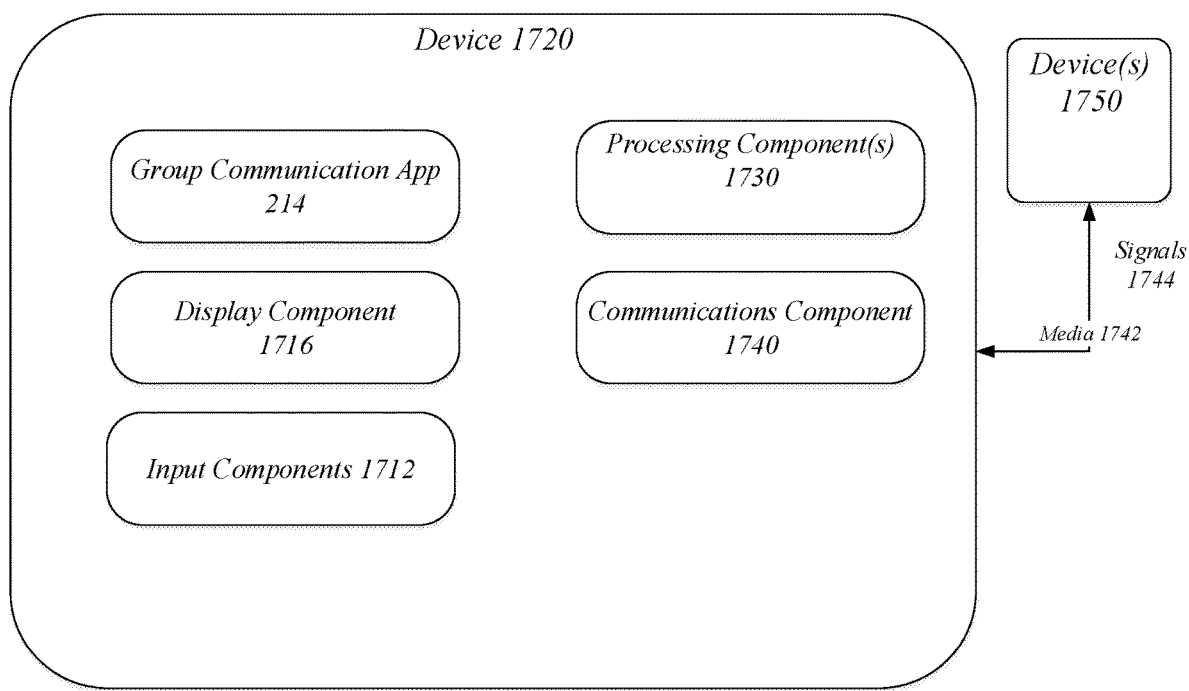
FIG. 17 illustrates an embodiment of a centralized system for the system of FIG. 1.

FIG. 17 illustrates a centralized system 1700. The centralized system 1700 may implement some or all of the structure and/or operations for the system 100 for providing enhanced group communications in a single computing entity, such as entirely within a single device 1720. In an embodiment, the centralized system 1700 may provide the functionality described above without the use of a message server 120.

The device 1720 may comprise any electronic device capable of receiving, processing, and sending information, and may be an embodiment of a mobile device, e.g. mobile device 110-1 or 200. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base
station, subscriber station, mobile subscriber center, radio network controller, router, hub, gateway, bridge, switch, machine, or combination thereof. The embodiments are not limited in this context.

The device 1720 may execute processing operations or logic for the system 100 using a processing component 1730. The processing component 1730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.
Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1720 may execute communications operations or logic for the system 100 using communications component 1740. The communications component 1740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1712 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1720 may communicate with other devices 1750 over a communications media 1712 using communications signals 1714 via the communications component 1740. The devices 1750 may be internal or external to the device 1720 as desired for a given implementation.

The device 1720 may include within it input components 1712, a group communication app 214 and a display component 1716. Device 1720 may be operative to carry out the tasks of these elements using processing component 1730 and communications component 1740. Devices 1750 may comprise any of devices 110-1, 200, or other mobile devices 110-a, the signals 1714 over media 1712 comprising the interactions between the device 1720 and its elements and these respective devices.

Figure 18:
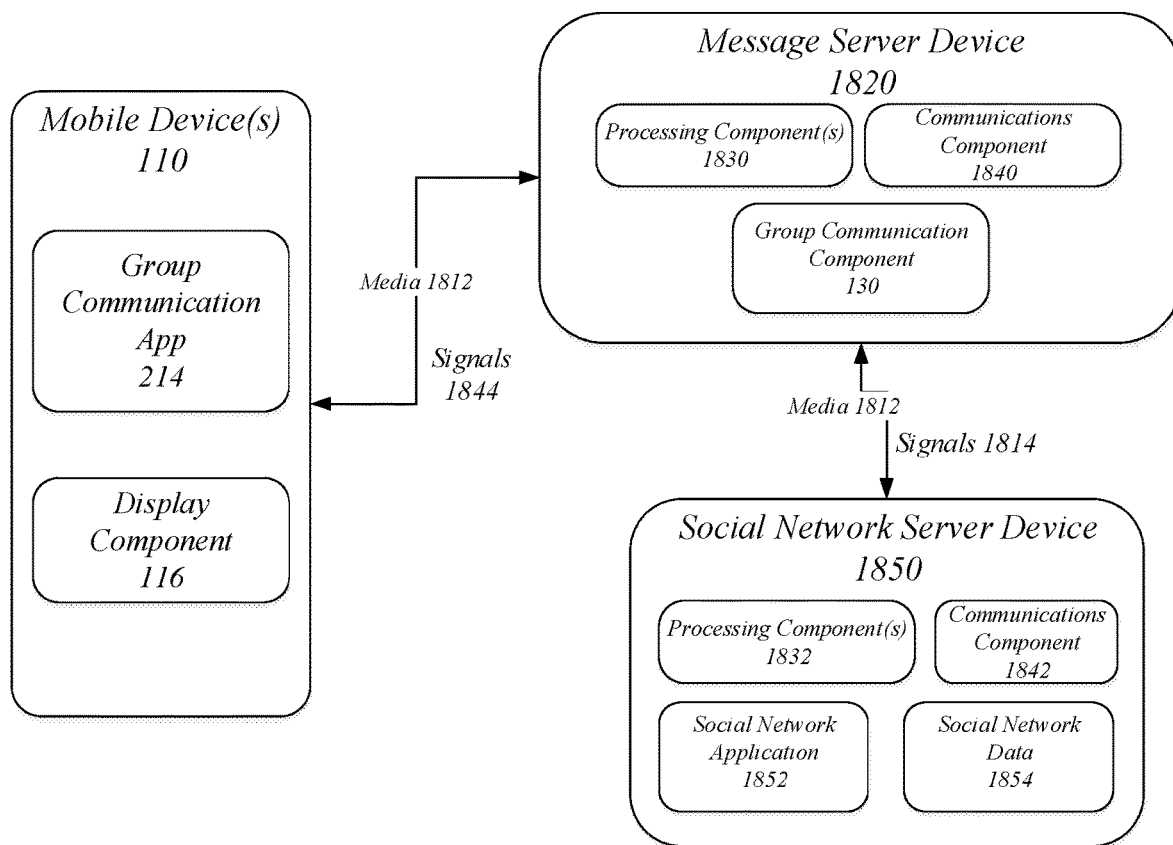
FIG. 18 illustrates an embodiment of a distributed system for the system of FIG. 1.

FIG. 18 illustrates an embodiment of a distributed system 1800. The distributed system 1800 may distribute portions of the structure and/or operations for the system 100 across multiple computing entities. Examples of distributed system 1800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1800 may comprise server devices 1820 and 1850. In general, the server devices 1820 and 1850 may be similar to the device 1720 as described with reference to FIG. 17. For instance, the server systems 1820 and 1850 may each comprise, respectively, a processing component 1830, 1832 and a communications component 1840, 1842, which are the same or similar to the processing component 1730 and the communications component 1740, respectively, as described with reference to FIG. 17. In another example, the server devices 1820 and 1850 may communicate over a communications media 1812 using communications signals 1814 via the communications components 1840, 1842.

The server devices 1820 and 1850 may comprise or employ one or more server programs that operate to perform various methodologies in accordance with the described embodiments. For example, server device 1820 may implement the group communication component 130. The server device 1850 may implement social network application 1852. It will be appreciated the server device 1820—or any of the server devices—may itself comprise multiple servers.

The social network application 1852 may generally provide social network operations, such as, but not limited to, storing and maintaining social network data 1854 about registered member users of the social network, connections between members, content published and consumed by members, statistical information about how content is consumed on the social network, and so forth. The group communication component 130 or the group communication app 114 may retrieve social network data from the social network application 1852, such as a set of connected members for an operator of the mobile device 110 participating in a group communication session. In various embodiments, a group communication session may be restricted to include only members of the same social network, and may be further restricted to participants that have a relationship to at least one other participant in the group of participants. The embodiments are not limited to these examples.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 19:
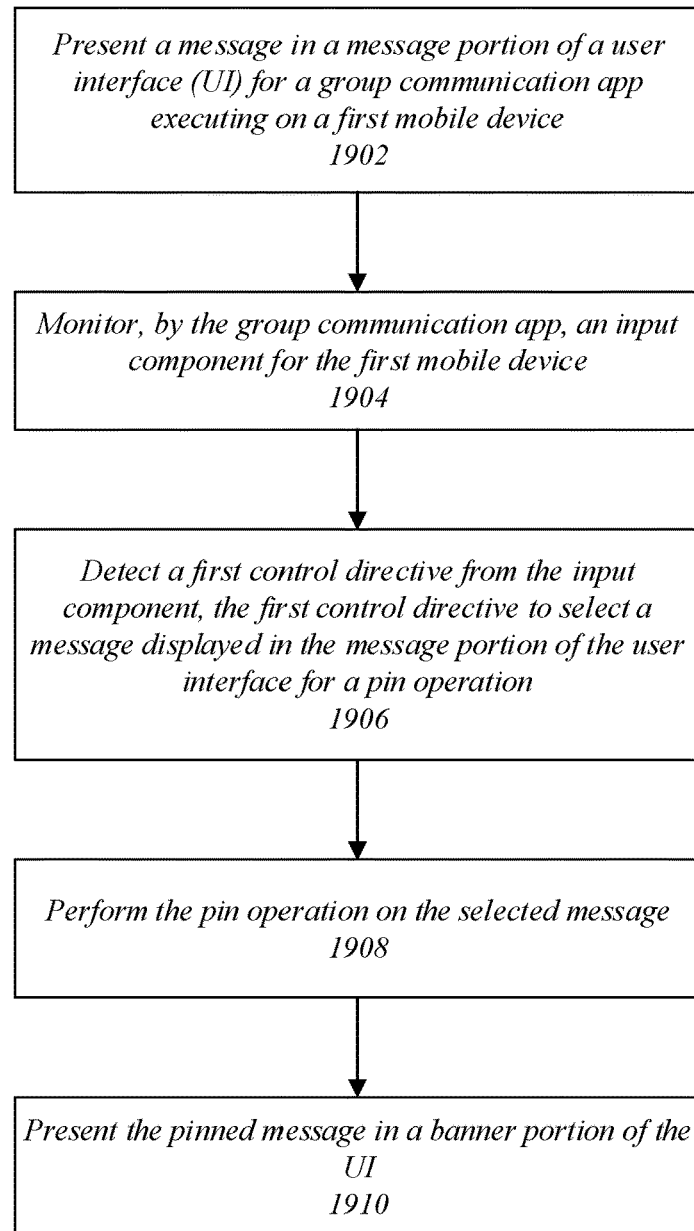
FIG. 19 illustrates an embodiment of a logic flow for the system of FIG. 1.

FIG. 19 illustrates an embodiment of a logic flow 1900 for the system 100. The logic flow 1900 may be representative of some or all of the operations executed by one or more embodiments described herein. In particular the logic flow 1900 may represent some or all of the operations performed by a group communication application executing on a mobile device to enhance a group communication session.

In the illustrated embodiment shown in FIG. 19, the logic flow 1900 may be operative at block 1902 to present a message in a message portion of a user interface (UI) for a group communication application ("app") executing on a first mobile device. For example, the group communication app 214 may present one or more messages 140 on a display component 216 of the mobile device 200. Presentation of the one or more messages 140 may include an indication of which participant in the conversation sent a messages, as well as a date and/or time that a message was sent, delivered, and/or seen.
The embodiments are not limited to these examples.

The logic flow 1900 may be operative at block 1904 to monitor, by the group communication app, an input component for the first mobile device. For example, the group communication app may monitor a touch sensitive interface, a microphone, a camera, an accelerometer, a biometric sensor, a global positioning system (GPS) component, a keyboard, or other input components for a control directive from an operator of the device. In an embodiment, the group communication app may only monitor the input component (s) while the group communication app is operating in the foreground of the device, and may stop monitoring the input components when the group communication app is minimized or otherwise operating in the background on the device.

The logic flow 1900 may be operative at block 1906 to detect a first control directive from the input component, the first control directive to select a message displayed in the message portion of the user interface for a pin operation. For example, the group communication app may detect a touch gesture on a location of a touch sensitive display component that corresponds to a message, or to a UI element presented with a message. In some embodiments, the first control directive is a single gesture that both selects a message and invokes a pin operation. In other embodiments, the first control directive may include a combination of control directives that select a message and invoke a pin operation.

The logic flow 1900 may be operative at block 1908 to perform the pin operation on the selected message. For example, the group communication app may send a pin request to a message server with a message identifier for the message server to perform a pin operation. The group communication app may alternatively send a pin request or pin command, with a message identifier, directly to the other devices participating in the conversation. A result of a pin operation may include a marking, storing or other indication that one message of the conversation is the pinned message.

The logic flow 1900 may be operative at block 1910 to present the pinned message in a banner portion of the UI For example, the group communication app may present the text, link, video, audio, or other message components in a reserved banner portion of the display component area being used to present the conversation. The
banner may include a percentage of the display area at the top or bottom of the display. In various embodiments, the pinned message may remain visible in the banner portion even when the original message is no longer in view in the message portion, for example, because subsequent messages have caused earlier messages to scroll out of view.

Presenting a pinned message in this manner provides a benefit to the conversation participants, particularly in large conversations (with more than 3 participants). The pinned message may provide information about a topic, event being planned, collaborative decision or other contextual information for the participants, even when various conversation threads meander off-topic or when multiple threads are present.

Figure 20:
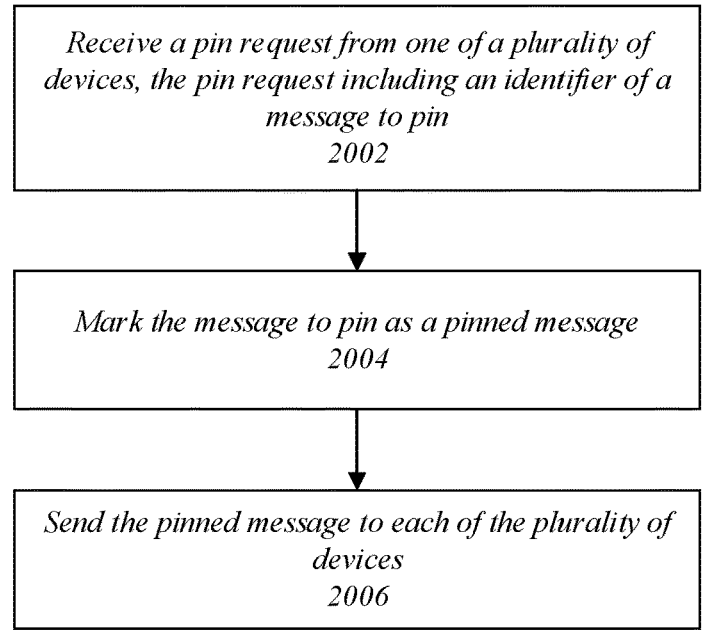
FIG. 20 illustrates an embodiment of a second logic flow for the system of FIG. 1.

FIG. 20 illustrates an embodiment of a logic flow 2000 for the system 100. The logic flow 2000 may be representative of some or all of the operations executed by one or more embodiments described herein. In particular, the logic flow 2000 may represent some or all of the operations performed by a message server, e.g. by a message server 120 or 320.

In the illustrated embodiment shown in FIG. 20, the logic flow 2000 may be operative at block 2002 to receive a pin request from one of a plurality of devices, the pin request including an identifier of a message to pin. For example, a group communication component 330 executing on the message server 320 may receive the pin request 104 including the message identifier 302.

The logic flow 2000 may be operative at block 2004 to mark the message to pin as a pinned message. For example, the group communication component 330 executing on the message server 320 may use the message identifier 302 to locate the message in messages 340, and mark the message with a flag, or other marker to indicate that the message is a pinned message. The pinned message, or the message identifier 302 for the pinned message, may be stored as part of conversation metadata.

The logic flow 2000 may be operative at block 2006 to send the pinned message to each of the plurality of devices. For example, the group communication component 330 executing on the message server 320 may send the pinned message, the message identifier 302, or a pin command including one of the pinned message or the message identifier to each mobile device operated by a participant in the conversation.

Figure 21:
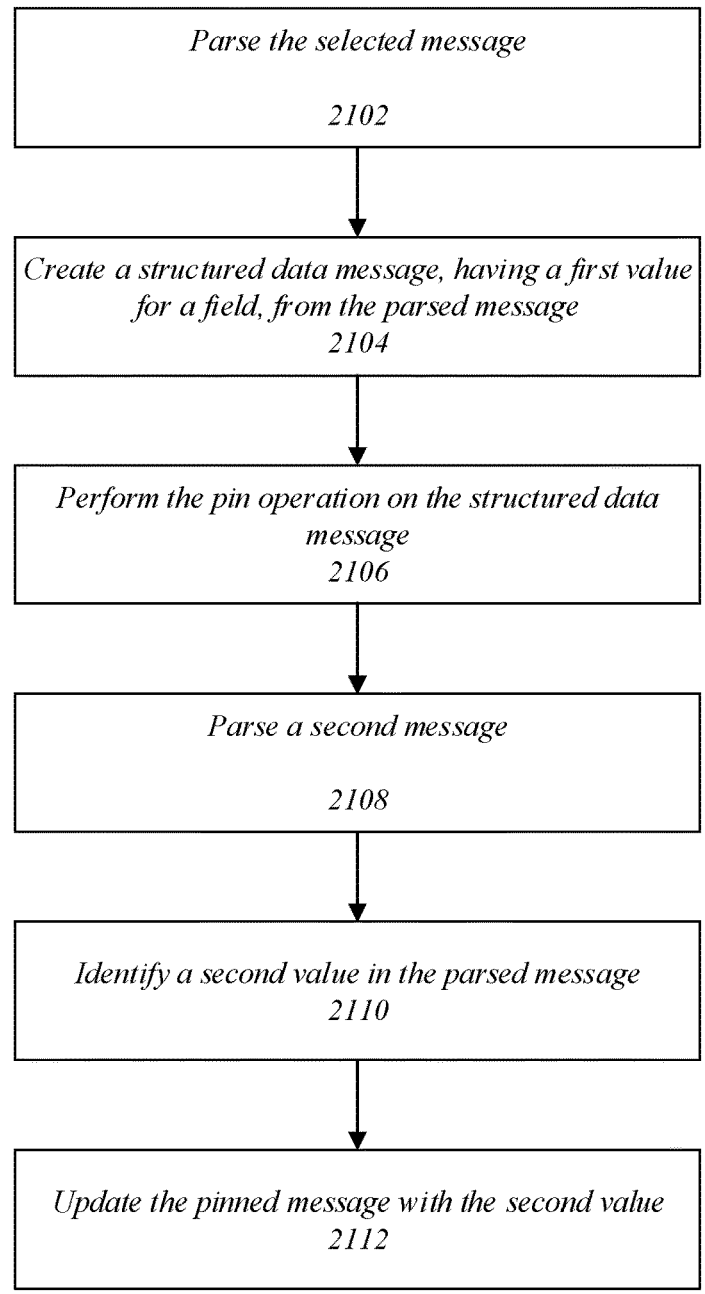
FIG. 21 illustrates an embodiment of a third logic flow for the system of FIG. 1.

FIG. 21 illustrates an embodiment of a logic flow 2100 for the system 100. The logic flow 2100 may be representative of some or all of the operations executed by one or more embodiments described herein. The operations of the logic flow 2100 may be performed by a group communication app 114 on a mobile device 110, a group communication component 130 on a message server 120, or by some combination thereof.

In the illustrated embodiment shown in FIG. 21, the logic flow 2100 may be operative at block 2102 to parse the selected message. For example, the group communication app 114 or the group communication component 130 may parse a message selected for pinning into elements, e.g. words or phrases, either before or after a pin operation has taken place.

The logic flow 2100 may be operative at block 2104 create a structured data message, having a first value for a field, from the parsed message. For example, the group communication app 114 or the group communication component 130 may detect elements of a type that correspond to a type of structured data, e.g. an event, a poll, or a game. The group communication app 114 or the group communication component 130 may generate a new instance of a structured data message, and may populate the fields with the values parsed from the message.

The logic flow 2100 may be operative at block 2106 to perform the pin operation on the structured data message. For example, if the group communication app 114 parsed the message and generated the structured data message, the group communication app 114 may send a pin request to a message server with the structured data message. If the group communication component 130 parsed the message and generated the structured data message, the group communication component 130 may pin the structured data message and send the pinned message as described above.

The logic flow 2100 may be operative at block 2108 to parse a second message. For example, the group communication app 114 or the group communication component 130 may parse a second message as in block 2102.

The logic flow 2100 may be operative at block 2110 to identify a second value in the parsed message. For example, the group communication app 114 or the group communication component 130 may identify another value that corresponds to one of the fields in the pinned structured data message.

The logic flow 2100 may be operative at block 2112 to update the pinned message with the second value. For example, the group communication app 114 or the group communication component 130 may replace the first value in the pinned message with the second value parsed from the second message and present the updated pinned message in the banner portion.

The logic flow 2100 may occur, for example, when a group of participants are trying to plan a group event. As various participants send messages that include, for example, a time at which the participant is available, a value in a time field of the pinned structured data message may be updated. In some embodiments, in order to prevent excessive updates, the logic flow 2100 may wait until at least some threshold number of messages including the second value are received before updating the pinned message.

Similarly, if the structured data message includes a poll having a set of possible poll responses, the logic flow 2100 may tally the received responses and update a count in the pinned message. The embodiments are not limited to these examples.

Figure 22:
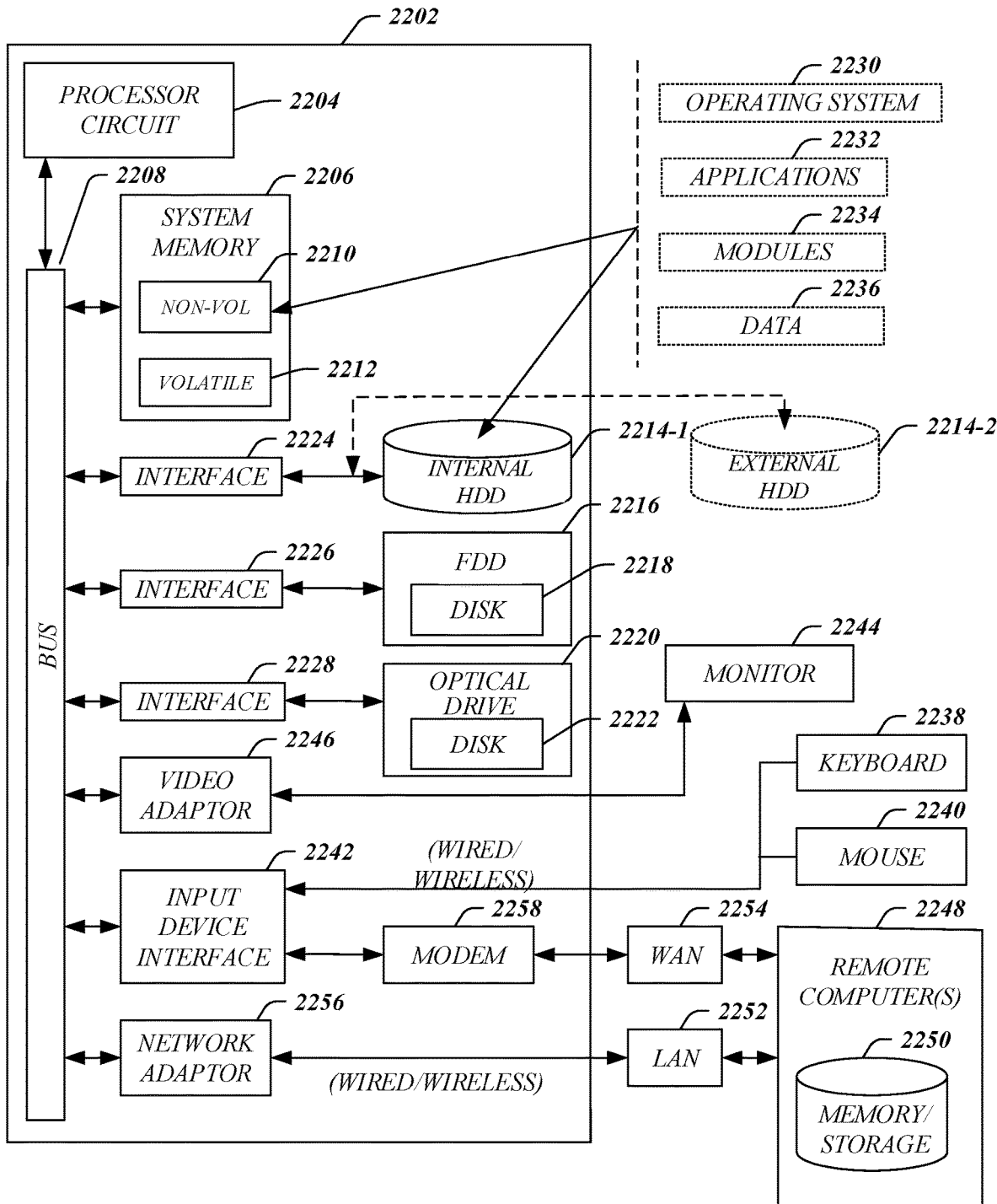
FIG. 22 illustrates an embodiment of a computing architecture.

FIG. 22 illustrates an embodiment of an exemplary computing architecture 2200 suitable for implementing various embodiments as previously described. In one embodiment, the computing architecture 2200 may comprise or be implemented as part of an electronic device. Examples of an electronic device may include those described with reference to FIGS. 17-18, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 2200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 2200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 2200.

As shown in FIG. 22, the computing architecture 2200 comprises a processing circuit 2204, a system memory 2206 and a system bus 2208. The processing circuit 2204 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 2204.

The system bus 2208 provides an interface for system components including, but not limited to, the system memory 2206 to the processing circuit 2204. The system bus 2208 can be any of several types of bus structure that may further interconnect to a memory bus (with or without a memory controller), a peripheral bus, and a local bus using any of a variety of commercially available bus architectures. Interface adapters may connect to the system bus 2208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 2200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 2206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory,
silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 22, the system memory 2206 can include non-volatile memory 2210 and/or volatile memory 2212. A basic input/output system (BIOS) can be stored in the non-volatile memory 2210.

The computer 2202 may include various types of computer-readable storage media in the form of one or more lower speed memory units, including an internal (or external) hard disk drive (HDD) 2214-1 and 2214-2, respectively, a magnetic floppy disk drive (FDD) 2216 to read from or write to a removable magnetic disk 2218, and an optical disk drive 2220 to read from or write to a removable optical disk 2222 (e.g., a
CD-ROM or DVD). The HDD 2214, FDD 2216 and optical disk drive 2220 can be connected to the system bus 2208 by a HDD interface 2224, an FDD interface 2226 and an optical drive interface 2228, respectively. The HDD interface 2224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 2210, 2212, including an operating system 2230, one or more application programs 2232, other program modules 2234, and program data 2236. In one embodiment, the one or more application programs 2232, other program modules 2234, and program data 2236 can include, for example, the various applications and/or components of the group communication app 114 or 130.

An operator can enter commands and information into the computer 2202 through one or more wire/wireless input devices, for example, a keyboard 2238 and a pointing device, such as a mouse 2240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 2204 through an input device interface 2242 that is coupled to the system bus 2208, but can be connected by other interfaces such as a parallel port, IEEE 1394 serial port, a game port, a USB port, an IR interface, and so forth.

A monitor 2244 or other type of display device is also connected to the system bus 2208 via an interface, such as a video adaptor 2246. The monitor 2244 may be internal or external to the computer 2202. In addition to the monitor 2244, a computer typically includes other peripheral output devices, such as speakers, printers, and so forth.

The computer 2202 may operate in a networked environment using logical connections via wire and/or wireless communications to one or more remote computers, such as a remote computer 2248. The remote computer 2248 can be a workstation, a server computer, a router, a personal computer, portable computer, microprocessor-based entertainment appliance, a peer device or other common network node, and typically includes many or all of the elements described relative to the computer 2202, although,
for purposes of brevity, only a memory/storage device 2250 is illustrated. The logical connections depicted include wire/wireless connectivity to a local area network (LAN) 2252 and/or larger networks, for example, a wide area network (WAN) 2254. Such LAN and WAN networking environments are commonplace in offices and companies, and facilitate enterprise-wide computer networks, such as intranets, all of which may connect to a global communications network, for example, the Internet.

When used in a LAN networking environment, the computer 2202 is connected to the LAN 2252 through a wire and/or wireless communication network interface or adaptor 2256. The adaptor 2256 can facilitate wire and/or wireless communications to the LAN 2252, which may also include a wireless access point disposed thereon for communicating with the wireless functionality of the adaptor 2256.

When used in a WAN networking environment, the computer 2202 can include a modem 2258, or is connected to a communications server on the WAN 2254, or has other means for establishing communications over the WAN 2254, such as by way of the Internet. The modem 2258, which can be internal or external and a wire and/or wireless device, connects to the system bus 2208 via the input device interface 2242. In a networked environment, program modules depicted relative to the computer 2202, or portions thereof, can be stored in the remote memory/storage device 2250. It will be appreciated that the network connections shown are exemplary and other means of establishing a communications link between the computers can be used.

The computer 2202 is operable to communicate with wire and wireless devices or entities using the IEEE 802 family of standards, such as wireless devices operatively disposed in wireless communication (e.g., IEEE 802.21 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.21x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 23:
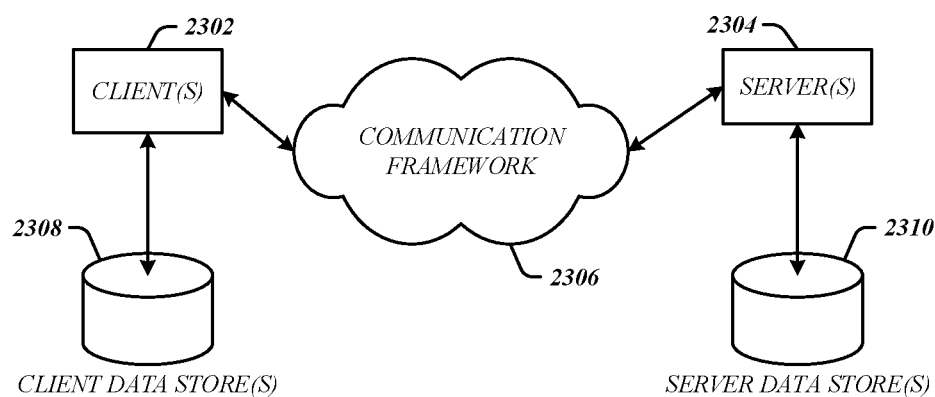
FIG. 23 illustrates an embodiment of a communications architecture.

FIG. 23 illustrates a block diagram of an exemplary architecture 2300 suitable for implementing various embodiments as previously described. The communications architecture 2300 includes various common communications elements, such as a transmitter, receiver, transceiver, radio, network interface, baseband processor, antenna, amplifiers, filters, power supplies, and so forth. The embodiments, however, are not limited to this implementation by the communications architecture 2300.

As shown in FIG. 23, the communications architecture 2300 comprises one or more clients 2302 and servers 2304. The clients 2302 may implement the devices 1720 and 1750. The servers 2304 may implement the server devices 1820 or 1840. The clients 2302 and the servers 2304 are operatively connected to one or more respective client data stores 2308 and server data stores 2310 that can be employed to store information local to the respective clients 2302 and servers 2304, such as cookies and/or associated contextual information.

The clients 2302 and the servers 2304 may communicate information among each other using a communication framework 2306. The communications framework 2306 may implement any well-known communications techniques and protocols. The communications framework 2306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 2306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2302 and the servers 2304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Accordingly, embodiments include methods, apparatuses, and computer-readable storage media for content enhancement on mobile devices. For example, a method may include presenting a message in a message portion of a user interface (UI) for a group communication application executing on a first device, where the group communication application communicates messages among multiple devices. The method may further include monitoring an input component for the first device and detecting a first control directive from the input component. The first control directive may select a message displayed in the message portion of the user interface. The method may further include performing a pin operation on the selected message; and presenting the pinned message in a banner portion of the UI. In various embodiments, a message may include any of: a text, a link, an image, or a video.

The method may include presenting the pinned message in the banner portion while the selected message remains visible in the message portion. The selected message may remain visible in the message portion, or may be removed when the selected message is presented in the banner portion.

Detecting the first control directive may include detecting a gesture on a touch sensitive input component, detecting a gesture of a defined length on a touch sensitive input component, detecting a gesture of a defined time on a touch sensitive input component, and/or detecting a gesture of a defined shape on a touch sensitive input component.

The method may include presenting a pinning UI element in proximity to each message presented in the message portion; and detecting the first control directive as a touch selection of the pinning UI element of the message.

The method may include detecting reserved text in the message as the first control directive, e.g. a hashtag symbol with a pinning key word.

Performing the pin operation of the method may include sending a pin request to a message server, and receiving the selected message as the pinned message from the message server, or sending a pin notification to the other devices.

The method may include receiving a second pinned message from a message server; and replacing the pinned message with the second pinned message in the banner portion, or adding the second pinned message to a layer in the banner portion on top of any previously pinned messages. The method may include presenting a UI element that, when selected by a control directive, presents a viewing interface for pinned messages on other layers of the banner portion. The UI element may be a touch-selectable element.

The method may include receiving a second control directive to unpin a pinned message; and removing the pinned message from the banner portion. The method may include sending an unpin request to a message server in response to receiving the second control directive; and removing the pinned message from the banner portion in response to receiving an unpin command from the message server.

The method may include receiving an unpin command from a message server; and removing the pinned message from the banner portion.

In some embodiments, the pinned message may comprise structured data that includes at least one field having a first value. The method may include receiving a second message comprising a second value; and updating the field in the pinned message with the second value. The method may include sending an update request including the second value to a message server; and receiving an updated pinned message including the second value from the message server. The method may include receiving a second value from a message server; and updating the field in the pinned message with the second value. The method may include receiving a second message; parsing the second message; detecting a second value for the field in the in parsed message; and updating the field in the pinned message with the second value.

In some embodiments, the pinned message may comprise a poll having a plurality of poll responses. The method may include parsing each message received from the mobile devices for a poll response; and updating a poll result with each received poll response.

The method may include parsing the selected message in response to the first control directive; creating a structured data message from the parsed message; and performing the pin operation on the structured data message.

The method may include providing a structured data composer UI by the group communication app to receive message data from an input component; generating a structured data message from the received message data; and sending the structured data message to the other plurality of mobile devices.

The method may include receiving a third control directive to delay displaying the pinned message until a condition is met. The condition to be met may include a time, a location of the first mobile device, and/or a proximity of the first mobile device to another of the other mobile devices.

The method may include displaying a menu UI in response to receiving the first control directive, the menu UI including an option that, when selected by a second control directive, causes the pin operation to be performed.

An apparatus may include one or more processing circuits; a storage unit storing instructions for a group communication component. When executed by the one or more processing circuits, the instructions may cause the group communication component to communicate messages among a plurality of devices operated by a group of users. The group communication component may receive a pin request from one of the plurality of devices, the pin request including an identifier of a message to pin; mark the message to pin as a pinned message; and send the pinned message to each of the devices.

The group communication component may receive a second pin request from one of the plurality of devices, including an identifier for a second message to pin; remove the marking of the message as a pinned message; mark the second message as a second pinned message; and send the second pinned message to each of the plurality of devices. The group communication component may store each pinned message in a storage unit.

The group communication component may receive an unpin request from one of the plurality of devices; remove the marking of the message as a pinned message; and send an unpin command to each of the plurality of devices.

In various embodiments, the pinned message may comprise structured data including at least one field having a first value. The group communication component may receive an update request from one of the plurality of devices including a second value; update the pinned message by replacing the first value with the second value in the pinned message; and send the updated pinned message to each of the plurality of devices.

The pinned message may be a poll having a plurality of poll responses. The group communication component may receive a second message from one of the plurality of devices; parse the second message for a poll response; update a count of the poll response from the parsed message; and send the updated count to each of the plurality of devices.

The group communication component may parse the message to pin; generate a structured data message from the parsed message, including at least one field having a value; and mark the structured data message to pin as the pinned message. The group communication component may receive a second message from one of the plurality of devices; parse the second message; identify a second value for the at least one field in the parsed message; update the pinned message with the second value; and send the updated pinned message to each of the plurality of devices. The group communication component may receive a second value from one of the plurality of devices; and send the second value to each of the plurality of devices.

In some embodiments, the group of users are members of a social network.

The group communication component may receive a delay pin request from one of the plurality of devices, the delay pin request including an identifier of a message to pin and a condition. The group communication component may mark the message to pin as a pinned message; and send the pinned message to each of the plurality of devices when the condition is met. The condition to be met may include a time, a location of one of the devices, and/or a proximity of one of the devices to another of the devices.

A computer-readable storage medium may include instructions for a group communication application that, when executed, cause a device to present a message in a message portion of a user interface (UI), the group communication application arranged to communicate messages among multiple devices. The instructions may further cause the device to monitor an input component for the device; and detect a first control directive from the input component, the first control directive to select a message displayed in the message portion of the user interface. The instructions may further, in response to the control directive, perform a pin operation on the selected message; and present the pinned message in a banner portion of the UI. A message may include a text, a link, an image, and/or a video. The input components may include a touch-sensitive interface, a microphone, a camera, an accelerometer, a biometric sensor, or a keyboard.

The instructions may cause the device to present the pinned message in the banner portion while the selected message remains visible in the message portion. The instructions may cause the device to remove the selected message from the message portion when the selected message is presented in the banner portion, or the selected message may remain visible in the message portion.

The instructions may cause the device to detect the first control directive as a gesture on a touch sensitive input component. For example, the touch gesture may be detected as: a gesture of a defined length on a touch sensitive input component, a gesture of a defined time on a touch sensitive input component, and/or a gesture of a defined shape on a touch sensitive input component.

The instructions may cause the device to present a pinning UI element in proximity to each message presented in the message portion; and detect the first control directive as a touch selection of the pinning UI element of the message.

The instructions may cause the device to detect reserved text in the message as the first control directive, for example as a hashtag symbol with a pinning key word.

The instructions may cause the device to send a pin request to a message server; and receive the selected message as the pinned message from the message server.

The instructions may cause the device to send a pin notification to the other devices.

The instructions may cause the device to receive a second pinned message from a message server; and replace the pinned message with the second pinned message in the banner portion.

The instructions may cause the device to receive a second pinned message from a message server; and add the second pinned message to a layer in the banner portion on top of any previously pinned messages. The instructions may cause the device to present a UI element that, when selected by a control directive, presents a viewing interface for pinned messages on other layers of the banner portion. The UI element may be a touch-selectable element.

The instructions may cause the device to receive a second control directive to unpin a pinned message; and remove the pinned message from the banner portion. The instructions may cause the device to send an unpin request to a message server in response to receiving the second control directive; and remove the pinned message from the banner portion in response to receiving an unpin command from the message server.

The instructions may cause the device to receive an unpin command from a message server; and remove the pinned message from the banner portion.

The instructions may cause the device to present a pinned message comprising structured data that includes at least one field having a first value. The instructions may cause the device to receive a second message comprising a second value; and update the field in the pinned message with the second value. The instructions may cause the device to send an update request including the second value to a message server; and receive an updated pinned message including the second value from the message server. The instructions may cause the device to receive a second value from a message server; and update the field in the pinned message with the second value. The instructions may cause the device to receive a second message; parse the second message; detect a second value for the field in the in parsed message; and update the field in the pinned message with the second value.

The pinned message may comprise a poll having a plurality of poll responses. The instructions may cause the device to parse each message received from the mobile devices for a poll response; and update a poll result with each received poll response.

The instructions may cause the device to parse the selected message in response to the first control directive; create a structured data message from the parsed message; and perform the pin operation on the structured data message.

The instructions may cause the device to provide a structured data composer UI by the group communication app to receive message data from an input component; generate a structured data message from the received message data; and send the structured data message to the other plurality of mobile devices.

The instructions may cause the device to receive a third control directive to delay displaying the pinned message until a condition is met. The condition to meet may include a time, a location of the first mobile device, and/or a proximity of the first mobile device to another of the other mobile devices.

The instructions may cause the device to display a menu UI in response to receiving the first control directive, the menu UI including an option that, when selected by a second control directive, causes the pin operation to be performed.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:
    causing, by a messaging server, display of one or more messages in a group messaging session on a plurality of user devices;
    receiving, by the messaging server, an indication from a first user device of the plurality of user devices that a particular message among the one or more messages is to be pinned to the group messaging session;
    causing, by the messaging server, display of information associated with a plurality of pinned messages in a window area separate from the display of the one or more messages in the group messaging session on the plurality of user devices concurrent with the display of the one or more messages on the plurality of user devices, the plurality of pinned messages include the particular message, each pinned message of the plurality of pinned messages is user selectable, via one of the plurality of user devices, to be unpinned and removed from the window area on the plurality of user devices;
wherein information associated with a specific pinned message is displayed in the window area on a second user device associated with a second user based on a location of the second user device.

2. The method as recited in claim 1, wherein information associated with the particular message is displayed in the window area on the plurality of user devices upon one or more conditions, specified in the indication, being met.

3. The method as recited in claim 1, wherein information associated with the specific pinned message is displayed in the window area on a third user device associated with a third user and a fourth user device associated with a fourth user when the third user device and the fourth user device are in a proximity to each other.

4. The method as recited in claim 1, wherein the causing display of information associated with a plurality of pinned messages further comprises:
sending, by the messaging server, a message identifier associated with the particular message to the plurality of user devices that indicates that the particular message is pinned to the group messaging session.

5. The method as recited in claim 1, wherein the causing display of information associated with a plurality of pinned messages further comprises:
sending, by the messaging server, the particular message to the plurality of user devices with an indication that the particular message is pinned to the group messaging session.

6. The method as recited in claim 1, wherein the particular message is indicated as pinned by a user via a menu displayed on the first user device.

7. A method, comprising:
causing, by a messaging server, display of one or more messages in a group messaging session on a plurality of user devices;
receiving, by the messaging server, an indication from a first user device of the plurality of user devices that a particular message among the one or more messages is to be pinned to the group messaging session;
causing, by the messaging server, display of information associated with a plurality of pinned messages in a window area separate from the display of the one or more messages in the group messaging session on the plurality of user devices concurrent with the display of the one or more messages on the plurality of user devices, the plurality of pinned messages include the particular message, each pinned message of the plurality of pinned messages is user selectable, via one of the plurality of user devices, to be unpinned and removed from the window area on the plurality of user devices;
wherein information associated with a specific pinned message is displayed in the window area on a second user device associated with a second user and a third user device associated with a third user when the second user device and the third user device are in a proximity to each other.

8. The method as recited in claim 7, wherein information associated with the particular message is displayed in the window area on the plurality of user devices upon one or more conditions, specified in the indication, being met.

9. The method as recited in claim 7, wherein information associated with the specific pinned message is displayed in the window area on a fourth user device associated with a fourth user based on a location of the fourth user device.

10. The method as recited in claim 7, wherein the causing display of information associated with a plurality of pinned messages further comprises:
sending, by the messaging server, a message identifier associated with the particular message to the plurality of user devices that indicates that the particular message is pinned to the group messaging session.

11. The method as recited in claim 7, wherein the causing display of information associated with a plurality of pinned messages further comprises:
sending, by the messaging server, the particular message to the plurality of user devices with an indication that the particular message is pinned to the group messaging session.

12. The method as recited in claim 7, wherein the particular message is indicated as pinned by a user via a menu displayed on the first user device.

13. One or more non-transitory computer-readable storage media, storing one or more sequences of instructions, which when executed by one or more processors cause performance of:
causing, by a messaging server, display of one or more messages in a group messaging session on a plurality of user devices;
receiving, by the messaging server, an indication from a first user device of the plurality of user devices that a particular message among the one or more messages is to be pinned to the group messaging session;
causing, by the messaging server, display of information associated with a plurality of pinned messages in a window area separate from the display of the one or more messages in the group messaging session on the plurality of user devices concurrent with the display of the one or more messages on the plurality of user devices, the plurality of pinned messages include the particular message, each pinned message of the plurality of pinned messages is user selectable, via one of the plurality of user devices, to be unpinned and removed from the window area on the plurality of user devices;
wherein information associated with a specific pinned message is displayed in the window area on a second user device associated with a second user based on a location of the second user device.

14. The one or more non-transitory computer-readable storage media as recited in claim 13, wherein information associated with the particular message is displayed in the window area on the plurality of user devices upon one or more conditions, specified in the indication, being met.

15. The one or more non-transitory computer-readable storage media as recited in claim 13, wherein information associated with the specific pinned message is displayed in the window area on a third user device associated with a third user and a fourth user device associated with a fourth user when the third user device and the fourth user device are in a proximity to each other.

16. The one or more non-transitory computer-readable storage media as recited in claim 13, wherein the causing display of information associated with a plurality of pinned messages further comprises:
sending, by the messaging server, a message identifier associated with the particular message to the plurality of user devices that indicates that the particular message is pinned to the group messaging session.

17. The one or more non-transitory computer-readable storage media as recited in claim 13, wherein the causing display of information associated with a plurality of pinned messages further comprises:

sending, by the messaging server, the particular message to the plurality of user devices with an indication that the particular message is pinned to the group messaging session.

18. The one or more non-transitory computer-readable storage media as recited in claim 13, wherein the particular message is indicated as pinned by a user via a menu displayed on the first user device.

19. One or more non-transitory computer-readable storage media, storing one or more sequences of instructions, which when executed by one or more processors cause performance of:

causing, by a messaging server, display of one or more messages in a group messaging session on a plurality of user devices;

receiving, by the messaging server, an indication from a first user device of the plurality of user devices that a particular message among the one or more messages is to be pinned to the group messaging session;

causing, by the messaging server, display of information associated with a plurality of pinned messages in a window area separate from the display of the one or more messages in the group messaging session on the plurality of user devices concurrent with the display of the one or more messages on the plurality of user devices, the plurality of pinned messages include the particular message, each pinned message of the plurality of pinned messages is user selectable, via one of the plurality of user devices, to be unpinned and removed from the window area on the plurality of user devices;

wherein information associated with a specific pinned message is displayed in the window area on a second user device associated with a second user and a third user device associated with a third user when the second user device and the third user device are in a proximity to each other.

20. The one or more non-transitory computer-readable storage media as recited in claim 19, wherein information associated with the particular message is displayed in the window area on the plurality of user devices upon one or more conditions, specified in the indication, being met.

21. The one or more non-transitory computer-readable storage media as recited in claim 19, wherein information associated with the specific pinned message is displayed in the window area on a fourth user device associated with a fourth user based on a location of the fourth user device.

22. The one or more non-transitory computer-readable storage media as recited in claim 19, wherein the causing display of information associated with a plurality of pinned messages further comprises:

sending, by the messaging server, a message identifier associated with the particular message to the plurality of user devices that indicates that the particular message is pinned to the group messaging session.

23. The one or more non-transitory computer-readable storage media as recited in claim 19, wherein the causing display of information associated with a plurality of pinned messages further comprises:

sending, by the messaging server, the particular message to the plurality of user devices with an indication that the particular message is pinned to the group messaging session.

24. The one or more non-transitory computer-readable storage media as recited in claim 19, wherein the particular message is indicated as pinned by a user via a menu displayed on the first user device.

\* \* \* \* \*